US012811149B2

(12) United States Patent
Li et al.

(10) Patent No.: US 12,811,149 B2
(45) Date of Patent: Nov. 24, 2026

(54) LITHIUM-ION SECONDARY BATTERY, BATTERY APPARATUS, ELECTRIC APPARATUS, PREPARATION METHOD FOR POSITIVE ELECTRODE ACTIVE MATERIAL, AND PREPARATION METHOD FOR POSITIVE ELECTRODE PLATE

(71) Applicant: CONTEMPORARY AMPEREX TECHNOLOGY CO., LIMITED, Ningde (CN)

(72) Inventors: Xiaojing Li, Ningde (CN); Hongyu Liu, Ningde (CN); Yingxi Lin, Ningde (CN); Changfeng Bie, Ningde (FJ); Siyuan He, Ningde (CN); Xiaoyang Jia, Ningde (CN); Huan Ni, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/365,221

(22) Filed: Oct. 22, 2025

(65) Prior Publication Data

US 2026/0302232 A1 Oct. 1, 2026

Related U.S. Application Data

(63) Continuation of application No. PCT/CN2025/085927, filed on Mar. 28, 2025.

(51) Int. Cl.
*H01M 4/587* (2010.01)
*B60L 50/64* (2019.01)
(Continued)

(52) U.S. Cl.
CPC ......... *H01M 4/587* (2013.01); *H01M 4/0404* (2013.01); *H01M 4/0435* (2013.01);
(Continued)

(58) Field of Classification Search
CPC .. H01M 4/587; H01M 4/0404; H01M 4/0435; H01M 4/366; H01M 4/525; H01M 10/0525; H01M 2220/20; B60L 50/64
See application file for complete search history.

(56) References Cited

U.S. PATENT DOCUMENTS

| | | | |
|---|---|---|---|
| 2010/0015514 | A1 | 1/2010 | Miyagi et al. |
| 2010/0291442 | A1 | 11/2010 | Wang et al. |

(Continued)

FOREIGN PATENT DOCUMENTS

| | | | |
|---|---|---|---|
| CA | 3034495 | A1 | 2/2020 |
| CA | 3075318 | A1 | 3/2021 |

(Continued)

OTHER PUBLICATIONS

English machine translation of Li et al. (CN 114068921 A) (Year: 2022).*

(Continued)

*Primary Examiner* — Brian R Ohara
*Assistant Examiner* — Emily Elizabeth Freeman
(74) *Attorney, Agent, or Firm* — K&L Gates LLP

(57) ABSTRACT

The disclosure relates to a lithium-ion secondary battery, a battery apparatus, an electric apparatus, and methods for preparing a positive electrode active material and a positive electrode plate. The lithium-ion secondary battery includes a positive electrode plate, a negative electrode plate, and an electrolyte. The positive electrode plate comprises a current collector and a film layer disposed on at least one side of the current collector. The film layer comprises a positive electrode active material including lithium-containing transition metal phosphate particles, at least part of the surfaces of which are coated with a carbon material. In a section of the film layer along the electrode plate thickness direction, an area proportion of particles with a particle size greater than (Continued)

or equal to 1.5 μm is 8.0% to 20.0%. In a cumulative distribution curve of graphitization degree, a median C50 of the film layer ranges from 0.95 to 1.20.

18 Claims, 4 Drawing Sheets

(51) Int. Cl.

| | |
|---|---|
| ***H01M 4/04*** | (2006.01) |
| ***H01M 4/36*** | (2006.01) |
| ***H01M 4/525*** | (2010.01) |
| ***H01M 10/0525*** | (2010.01) |

(52) U.S. Cl.

CPC ........... *H01M 4/366* (2013.01); *H01M 4/525* (2013.01); *H01M 10/0525* (2013.01); *B60L 50/64* (2019.02); *H01M 2220/20* (2013.01)

(56) References Cited

U.S. PATENT DOCUMENTS

| | | | | |
|---|---|---|---|---|
| 2012/0058375 | A1 | 3/2012 | Tanaka et al. | |
| 2013/0171523 | A1 | 7/2013 | Chen et al. | |
| 2014/0342225 | A1 | 11/2014 | Isshiki et al. | |
| 2022/0069377 | A1 | 3/2022 | Rhee et al. | |
| 2022/0102711 | A1 | 3/2022 | Kang et al. | |
| 2023/0044385 | A1 | 2/2023 | Kim et al. | |
| 2023/0115744 | A1* | 4/2023 | Pan | H01M 4/0435 429/221 |
| 2024/0145685 | A1* | 5/2024 | Yang | H01M 4/622 |
| 2025/0011172 | A1 | 1/2025 | Zhang et al. | |
| 2025/0105241 | A1 | 3/2025 | Sun et al. | |
| 2025/0391871 | A1* | 12/2025 | Liu | H01M 4/622 |

FOREIGN PATENT DOCUMENTS

| | | | | | |
|---|---|---|---|---|---|
| CN | 102468479 | A | | 5/2012 | |
| CN | 107001622 | A | | 8/2017 | |
| CN | 108807974 | A | | 11/2018 | |
| CN | 109148836 | A | | 1/2019 | |
| CN | 111554903 | A | | 8/2020 | |
| CN | 113745503 | A | | 12/2021 | |
| CN | 114068921 | A | * | 2/2022 | H01M 4/04 |
| CN | 114256443 | A | | 3/2022 | |
| CN | 115188927 | A | | 10/2022 | |
| CN | 115513515 | A | | 12/2022 | |
| CN | 115732744 | A | | 3/2023 | |
| CN | 115810719 | A | | 3/2023 | |
| CN | 115954452 | A | | 4/2023 | |
| CN | 116072816 | A | | 5/2023 | |
| CN | 116190590 | A | | 5/2023 | |
| CN | 116779777 | A | | 9/2023 | |
| CN | 117083729 | A | | 11/2023 | |
| CN | 117096287 | A | | 11/2023 | |
| CN | 117175018 | A | | 12/2023 | |
| CN | 117542961 | A | | 2/2024 | |
| CN | 117865099 | A | | 4/2024 | |
| CN | 118173736 | A | | 6/2024 | |
| CN | 118435395 | A | | 8/2024 | |
| CN | 118495490 | A | * | 8/2024 | H01M 6/52 |
| CN | 118538912 | A | | 8/2024 | |
| CN | 118693274 | A | | 9/2024 | |
| CN | 119009070 | A | | 11/2024 | |
| CN | 119069641 | A | | 12/2024 | |
| CN | 119079967 | A | | 12/2024 | |
| CN | 119092645 | A | | 12/2024 | |
| CN | 119133357 | A | | 12/2024 | |
| CN | 119153758 | A | | 12/2024 | |
| CN | 119191251 | A | | 12/2024 | |
| CN | 119208701 | A | | 12/2024 | |
| CN | 119218987 | A | | 12/2024 | |
| CN | 119324204 | A | | 1/2025 | |
| CN | 119340353 | A | | 1/2025 | |
| CN | 119400857 | A | | 2/2025 | |
| CN | 119518059 | A | | 2/2025 | |
| CN | 119591075 | A | | 3/2025 | |
| CN | 119852497 | A | | 4/2025 | |
| CN | 120280457 | A | | 7/2025 | |
| CN | 120978169 | A | | 11/2025 | |
| CN | 120978170 | A | | 11/2025 | |
| CN | 120999077 | A | | 11/2025 | |
| CN | 121035306 | A | | 11/2025 | |
| CN | 121149361 | A | | 12/2025 | |
| CN | 120048983 | B | | 1/2026 | |
| CN | 121355331 | A | | 1/2026 | |
| EP | 4075538 | A1 | | 10/2022 | |
| JP | 2006302671 | A | | 11/2006 | |
| JP | 2012221716 | A | | 11/2012 | |
| JP | 2017065975 | A | | 4/2017 | |
| KR | 20230148175 | A | | 10/2023 | |
| KR | 20240076555 | A | | 5/2024 | |
| KR | 20240144356 | A | | 10/2024 | |
| KR | 20240145002 | A | | 10/2024 | |
| KR | 20240147759 | A | | 10/2024 | |
| WO | 2022/062745 | A1 | | 3/2022 | |
| WO | 2024036210 | A1 | | 2/2024 | |
| WO | 2024/055296 | A1 | | 3/2024 | |
| WO | 2024092683 | A1 | | 5/2024 | |
| WO | 2025/015857 | A1 | | 1/2025 | |

OTHER PUBLICATIONS

English machine translation of Ge et al. (CN 118495490 A) (Year: 2024).*

English machine translation of Chen et al. (CN 117175018 A) (Year: 2023).*

Notification to Grant and Notification on Payment of Registration in the counterpart CN application No. 202510563562.5, mailed on Jun. 24, 2025, 9 pages with English translation.

First Office Action in the counterpart CN application No. 202510563562.5, mailed on Jun. 10, 2025, 21 pages with English translation.

International Search Report (with English Machine Translation), mailed Dec. 24, 2025, for International Patent Application Serial No. PCT/CN2025/085927.

Office Action (with English Machine Translation), mailed Dec. 4, 2025, for corresponding Korean Patent Application Serial No. 10-2025-7029997.

Office Action (with English Machine Translation), mailed Jun. 2, 2026, for Korean Patent Application Serial No. 10-2025-7038452.

Extended European Search Report, mailed Jun. 25, 2026, for European Patent Application Serial No. 25801489.3.

International Search Report (with English Machine Translation), mailed Jun. 10, 2026, for International Patent Application Serial No. PCT/CN2026/086793.

International Search Report (with English Machine Translation), mailed Jun. 27, 2026, for International Patent Application Serial No. PCT/CN2026/086776.

Office Action (with English Machine Translation), mailed May 21, 2026, for Korean Patent Application Serial No. 10-2025-7029997.

Non-Final Office Action, mailed Aug. 13, 2026, for U.S. Appl. No. 19/676,837.

International Search Report (with English Machine Translation), mailed Aug. 19, 2026, for International Patent Application Serial No. PCT/CN2026/096506.

International Search Report (with English Machine Translation), mailed Aug. 5, 2026, for International Patent Application Serial No. PCT/CN2026/096520.

Office Action (with English Machine Translation), mailed Sep. 24, 2026, for Chinese Patent Application Serial No. 202610030108.8.

Office Action (with English Machine Translation), mailed Sep. 25, 2026, for Chinese Patent Application Serial No. 202610030113.9.

International Search Report (with English Machine Translation), mailed Sep. 20, 2026, for International Application Serial No. PCT/CN2026/109828.

Ren, "Preparation and modification of high-vibration lithium iron phosphate," Full-Text Database of Outstanding Master's Theses in

(56) References Cited

OTHER PUBLICATIONS

China—Engineering & Technology (Series I), 2020, Issue 03, English Abstract Attached.

* cited by examiner

LITHIUM-ION SECONDARY BATTERY, BATTERY APPARATUS, ELECTRIC APPARATUS, PREPARATION METHOD FOR POSITIVE ELECTRODE ACTIVE MATERIAL, AND PREPARATION METHOD FOR POSITIVE ELECTRODE PLATE

TECHNICAL FIELD

The present application relates to the technical field of lithium-ion secondary batteries, and in particular, to a lithium-ion secondary battery, a battery apparatus, an electric apparatus, a preparation method for a positive electrode active material, and a preparation method for a positive electrode plate.

BACKGROUND

In recent years, lithium-ion secondary batteries are widely used in energy storage power systems such as hydroelectric power stations, thermal power stations, wind power stations, and solar power stations, as well as a variety of fields such as electric tools, electric bicycles, electric motorcycles, electric vehicles, military equipment, and aerospace.

Positive electrode active materials are an important component of the lithium-ion secondary batteries. Lithium-containing transition metal phosphate materials have the features of stable structure, good safety, and long cycle life, and have broad development prospects. With the increasing demands for the energy density and the kinetics performance of the secondary batteries based on the lithium-containing transition metal phosphate systems in the market, it is difficult to simultaneously improve the above performances in the prior art, consequently presenting a technical problem that needs to be resolved urgently in the art.

SUMMARY

The present application is made in view of the above issues, and an objective of the present application is to provide a lithium-ion secondary battery that has both a high energy density and a good kinetics performance.

A first aspect of the present application provides a lithium-ion secondary battery, which includes a positive electrode plate, a negative electrode plate, and an electrolyte. The positive electrode plate includes a positive electrode current collector and a positive electrode film layer arranged on at least one side of the positive electrode current collector. The positive electrode film layer includes a positive electrode active material, and the positive electrode active material includes lithium-containing transition metal phosphate particles with a surface at least partially provided with a carbon coating material. In a section of the positive electrode film layer in a thickness direction of the electrode plate, an area proportion of particles having a particle size greater than or equal to 1.5 μm is greater than or equal to 8.0% and less than or equal to 20.0%. In a cumulative distribution curve of a C value of a graphitization degree obtained in a mapping mode by a laser confocal microscope Raman spectrometer for the positive electrode film layer, a median $C_{50}$ of the graphitization degree is greater than or equal to 0.95 and less than or equal to 1.20, where the C value of the graphitization degree is $I_G/I_D$, $I_G$ represents a G-band intensity of a Raman spectrum at 1580±100 $cm^{-1}$, and $I_D$ represents a D-band intensity of the Raman spectrum at 1350±100 $cm^{-1}$.

By controlling the area proportion of the particles having the particle size greater than or equal to 1.5 μm in the positive electrode film layer to be greater than or equal to 8.0% and less than or equal to 20.0%, a significant buckets effect brought by large-sized particles can be reduced, which facilitates keeping the resistance of a battery at a relatively low level, thereby improving the kinetics performance of the battery. However, this limits further improvement of a compaction density of the electrode plate. In an embodiment of the present application, by further controlling the median $C_{50}$ of the graphitization degree to be greater than or equal to 0.95 and less than or equal to 1.20, the graphitization degree of the particles in the positive electrode film layer is improved, and a crystallization degree of a carbon layer on the surface of the particles is increased, so that particle slippage can be easily implemented in a process of rolling the positive electrode active material to form a film, and an increase in a compaction density of the positive electrode film layer is further obtained by the characteristic of easy slippage of the particles, thereby achieving a balance between the kinetics performance and the energy density of the battery.

In any of embodiments, in the cumulative distribution curve of the C value of the graphitization degree obtained in the mapping mode by the laser confocal microscope Raman spectrometer for the positive electrode film layer, the median $C_{50}$ of the graphitization degree is 0.97 to 1.13, optionally, 1.0 to 1.10.

The median $C_{50}$ of the graphitization degree of the positive electrode film layer is within the above range, which facilitates further improving a degree of easy slippage between the particles, so as to offset insufficient gradation caused by fewer large particles in the positive electrode film layer, and further improving the compaction density of the electrode plate while maintaining the high kinetics performance of the battery, thereby achieving a balance between the kinetics performance and the energy density of the battery.

In any of embodiments, in the cumulative distribution curve of the C value of the graphitization degree obtained in the mapping mode by the laser confocal microscope Raman spectrometer for the positive electrode film layer, a concentration degree $(C_{90}-C_{10})/C_{50}$ of the C value is 0.01 to 0.04.

The concentration degree of the C value of the positive electrode film layer is 0.01 to 0.04, indicating that the graphitization degree of coating carbon on a surface of the positive electrode active material is relatively consistent, which means that the positive electrode active material has good coating uniformity and consistency, so that slippage resistance caused by inconsistency of the graphitization degree of the particles in the positive electrode active material and further caused local stress concentration can be reduced. Therefore, by uniform slippage between the particles of the positive electrode active material, the electrode plate can achieve a relatively high compaction density as a whole under a relatively low rolling pressure, which further improves the compaction density of the electrode plate and the energy density of the battery while maintaining the good kinetics performance of the battery.

In any of embodiments, in the cumulative distribution curve of the C value of the graphitization degree obtained in the mapping mode by the laser confocal microscope Raman spectrometer for the positive electrode film layer, a concentration degree $(C_{90}-C_{10})/C_{50}$ of the C value is 0.02 to 0.04.

The concentration degree $(C_{90}-C_{10})/C_{50}$ of the C value is within the above range, which facilitates further improving the consistency of the graphitization degree of the carbon on the surface of the positive electrode active material, thereby improving the degree of slippage between the particles, and further improving the compaction density of the electrode plate and the energy density of the battery while maintaining the good kinetics performance of the battery.

In any of embodiments, in the cumulative distribution curve of the C value of the graphitization degree obtained in the mapping mode by the laser confocal microscope Raman spectrometer for the positive electrode film layer, $C_{90}$ of the graphitization degree is 1.00 to 1.30, optionally, 1.02 to 1.15.

The $C_{90}$ of the graphitization degree is within the above range and is relatively close to the median $C_{50}$ of the graphitization degree, indicating that a distribution interval of the graphitization degree of the positive electrode film layer is narrow, which facilitates uniform slippage between the particles so as to improve the compaction density of the positive electrode plate.

In any of embodiments, in the cumulative distribution curve of the C value of the graphitization degree obtained in the mapping mode by the laser confocal microscope Raman spectrometer for the positive electrode film layer, $C_{10}$ of the graphitization degree is 0.92 to 1.10, optionally, 0.98 to 1.08.

The $C_{10}$ of the graphitization degree is within the above range, indicating that different positions in the positive electrode film layer all have a relatively high graphitization degree, which facilitates uniform slippage of the particles, thereby reducing an occurrence probability of a local stress concentration phenomenon, and further improving the compaction density of the electrode plate.

In any of embodiments, in the section of the positive electrode film layer in the thickness direction of the electrode plate, an area proportion of particles having a particle size of 1.5 μm to 5 μm is 9.0% to 20.0%.

In the section of the positive electrode film layer in the thickness direction of the electrode plate, the area proportion of the particles having the particle size of 1.5 μm to 5 μm is within the above range, which can further reduce a hindering effect of the large-sized particles on the surface of the electrode plate on infiltration and diffusion of an electrolyte solution in the positive electrode film layer, thereby improving consistency of a diffusion rate of lithium ions in the particles of the positive electrode active material, reducing local polarization, and improving the kinetics performance of the battery.

In any of embodiments, in the section of the positive electrode film layer in the thickness direction of the electrode plate, the area proportion of the particles having the particle size of 1.5 μm to 5 μm is 10.0% to 20.0%.

In a process of improving gradation of the particles and increasing the size or proportion of the large particles, the particles having the particle size of 1.5 μm to 5 μm are unavoidably introduced. The area proportion of the particles having the particle size of 1.5 μm to 5 μm is within the above range, which facilitates improving the compaction degree of the electrode plate while taking the kinetics performance of the battery into consideration.

In any of embodiments, in the section of the positive electrode film layer in the thickness direction of the electrode plate, an area proportion of particles having a particle size greater than or equal to 5 μm is 0.

Researches indicate that the particles having the particle size greater than or equal to 5 μm in the positive electrode film layer may significantly worsen the infiltration of the electrolyte solution in the positive electrode film layer and the diffusion thereof in the particles of the active material, and when the area proportion of the particles having the particle size greater than or equal to 5 μm is 0, it facilitates further reducing the internal resistance of the battery and improving the kinetics performance of the battery.

In any of embodiments, in the section of the positive electrode film layer in the thickness direction of the electrode plate, an area proportion of particles having a particle size greater than or equal to 1 μm and less than 1.5 μm is 15.0% to 25.0%, optionally, 16.0% to 24%, further optionally, 16% to 20%.

In the section of the positive electrode film layer in the thickness direction of the electrode plate, the area proportion of the particles having the particle size greater than or equal to 1 μm and less than 1.5 μm is within the above range, which facilitates further improving the compaction density of the electrode plate and improving the energy density of the battery while maintaining the good kinetics performance of the battery.

In any of embodiments, in a cumulative distribution curve of a particle areal sphericity obtained from the section of the positive electrode film layer in the thickness direction of the electrode plate, a median $L_{A50}$ of sphericity is 0.60 to 0.85, optionally, 0.65 to 0.80.

Particles with the median $L_{A50}$ of the sphericity within the above range are approximately spherical, which facilitates slippage between the particles under an external force. This can further improve the compaction density of the electrode plate and improve the energy density of the battery.

In any of embodiments, in a cumulative distribution curve of a particle roughness area obtained from the section of the positive electrode film layer in the thickness direction of the electrode plate, a median $R_{A50}$ of roughness is 0.92 to 0.96.

Particles with the median $R_{A50}$ of the roughness within the above range have a relatively smooth surface, so that a friction force between the particles is relatively small, and slippage easily occurs under an external force, which can further improve the compaction density of the electrode plate, and improve the energy density of the battery.

In any of embodiments, an iron dissolution rate of the positive electrode film layer is 500 ppm to 2000 ppm, optionally, 500 ppm to 1500 ppm.

The positive electrode active material having the iron dissolution rate within the above range has a relatively complete and compact carbon coating layer, which can improve electric contact between positive electrode active materials, thereby improving the electric conductivity of the positive electrode active material, reducing polarization of the positive electrode active material, and further optimizing the kinetics performance of the lithium-ion secondary battery. In addition, the space occupancy of the compact coating carbon layer is low, and in the rolling process, particle gaps are easily compressed by stress, which can improve both the compaction density of the electrode plate and the energy density of the battery.

In any of embodiments, a mass content of a carbon element is 0.8% to 1.8%, optionally, 0.90% to 1.5% based on a total mass of the positive electrode active material.

Compared with a positive electrode active material of lithium-containing transition metal phosphate in the prior art, the positive electrode active material has a relatively low carbon coating content, which can further improve the loading capacity of the lithium-containing transition metal phosphate in the positive electrode plate, thereby improving the energy density of the lithium-ion secondary battery.

In any of embodiments, a lithium-iron antisite defect concentration of the positive electrode active material is 0.1% to 1.5%, optionally, 0.3% to 1.0%.

The positive electrode active material in this embodiment of the present application has a low lithium-iron antisite defect, which facilitates uniform transmission of the lithium ions in a solid phase, thereby further improving the kinetics performance of the lithium-ion secondary battery.

In any of embodiments, the lithium-containing transition metal phosphate includes a component having the following general formula: $Li_mF_xP_yO_jQ_q$, where Q includes one or more of Al, Na, K, Mg, Cu, Mn, Cr, Zn, Pb, Ca, Co, Ni, Sr, Nb, V, Ti, B, S, Si, N, F, Cl, and Br, $0.8 \leq m \leq 1.15$, $0.9 \leq x \leq 1$, $0.95 \leq y \leq 1$, $3.5 \leq j \leq 4$, and $0 \leq q \leq 0.1$.

Selecting a proper modifying element Q can improve an ion diffusion path of the positive electrode active material, improve a lithium ion diffusion rate of the positive electrode active material, and improve the kinetics performance of the battery.

In any of embodiments, the positive electrode active material includes one or more of lithium iron phosphate, a doping modification material thereof, and a coating modification material thereof.

In any of embodiments, the positive electrode active material includes a titanium element, and a mass content of the titanium element is 2000 ppm to 6000 ppm based on a total mass of the positive electrode active material.

The positive electrode active material in this embodiment of the present application has a high content of the titanium element, and surprisingly, a high addition amount of the titanium element does not form a harmful impurity phase that have negative effects on the energy density and the kinetics performance of the battery. Although the reason is unclear, it is presumed that the titanium element and a phosphate radical and other elements (for example, a lithium element) may together form a fast ion conductor, which in turn improves the kinetics performance of the battery.

In any of embodiments, a powder tap density of the positive electrode active material is 0.70 g/cm$^3$ to 1.50 g/cm$^3$, optionally, 0.70 g/cm$^3$ to 1.20 g/cm$^3$.

An effective graduation autonomously formed by the positive electrode active material in this embodiment of the present application is limited, so the tap density is relatively low. However, with a high graphitization degree of the positive electrode film layer, easy slippage can be achieved under the external force to improve the compaction density.

In any of embodiments, a powder compaction density of the positive electrode active material under a pressure of 3 T is 2.50 g/cm$^3$ to 2.70 g/cm$^3$, optionally, 2.52 g/cm$^3$ to 2.68 g/cm$^3$.

Although the area proportion of the particles having the particle size greater than or equal to 1.5 μm of the positive electrode active material is low, the positive electrode active material can still achieve a high compaction density under the external force by the high graphitization degree, thereby providing a material basis for improving the compaction density of the electrode plate and preparing a lithium-ion secondary battery with a high energy density.

In any of embodiments, a powder resistivity of the positive electrode active material under a pressure intensity of 8 MPa is 0.5 Ω·cm to 30.0 Ω·cm, optionally, 2 Ω·cm to 20.0 Ω·cm.

The positive electrode active material has the high graphitization degree. Therefore, with a sp$^2$ structure of the surface carbon, fast conduction of electrons between the particles can be easily achieved, so that the positive electrode active material has a low powder resistivity, which facilitates increasing a solid-phase transmission rate of the electrons, thereby further improving the kinetics performance of the battery.

In any of embodiments, a gravimetric discharge capacity of the positive electrode active material at room temperature at a discharge rate of 1C is 135 mAh/g to 150 mAh/g.

The positive electrode active material has a high gravimetric discharge capacity at the rate of 1C, indicating that the positive electrode active material has good charge and discharge capabilities, which facilitates improving the kinetics performance of the battery.

In any of embodiments, a discharge capacity ratio η of the positive electrode active material discharged to 3.2 V is greater than or equal to 85%. η is defined as: at room temperature, a button battery including the positive electrode active material is charged and discharged twice at a constant current with a rate of 0.1C in a voltage range of 2.0 V to 3.75 V, and then is charged and discharged once at a constant current with a rate of 1C, and in a charge and discharge test at the rate of 1C, a capacity value of a discharge voltage of 3.2 Vis extracted and denoted as $C_1$, a capacity value of a discharge voltage to 2.0 V is extracted and denoted as $C_2$, and $n–C_1/C_2$, where a charge process includes constant-voltage charge, with a constant voltage of 3.75 V, and a constant voltage cut-off current of 50 μA.

A high discharge capacity ratio of the positive electrode active material, discharged to 3.2 V, used in the lithium-ion secondary battery in this embodiment of the present application means that the positive electrode active material has a good kinetics performance. In addition, a high value of n indicates that the lithium-ion secondary battery including the positive electrode active material still has a high voltage when discharged to a low state of charge (SOC), which facilitates maintaining a good power performance.

In any of embodiments, in a 0.1C discharge curve of the button battery including the positive electrode active material, a discharge plateau exists in a voltage range of 2.5 V to 2.9 V.

The button battery including the positive electrode active material in this embodiment of the present application displays a new charge and discharge plateau in a voltage range of 2.5 V to 2.9 V, which facilitates increasing a discharge interval of the battery, thereby improving the energy density of the battery.

In any of embodiments, a mass content of a conductive agent is 0 to 1.5%, optionally, 0 based on a total mass of the positive electrode film layer.

The carbon layer of the positive electrode active material has a high graphitization degree, so that the positive electrode active material has good electronic conductivity, and use of the conductive agent in the positive electrode film layer can be reduced or even eliminated, thereby facilitating further increasing the loading capacity of the positive electrode active material and improving the energy density of the lithium-ion secondary battery.

In any of embodiments, the positive electrode film layer further includes a binder, and a mass content of the positive electrode active material is 95.5% to 99.5%, optionally, 96.5%-99.5%; and a mass content of the binder is 0.5% to 3% based on the total mass of the positive electrode film layer.

In any of embodiments, a single-side areal density of the positive electrode film layer is 300 mg/1540 mm$^2$ to 450 mg/1540 mm$^2$.

The positive electrode film layer having the areal density within the above range can facilitate improving the energy density of the lithium-ion secondary battery.

In any of embodiments, when the lithium-ion secondary battery is in a fully discharged state, the compaction density of the positive electrode film layer is 2.51 g/cm$^3$ to 2.73 g/cm$^3$.

In any of embodiments, when the lithium-ion secondary battery is in the fully discharged state, the compaction density of the positive electrode film layer is 2.55 g/cm$^3$ to 2.70 g/cm$^3$.

The compaction density of the positive electrode film layer is within the above range, which facilitates improving the energy density of the lithium-ion secondary battery.

In any of embodiments, when the lithium-ion secondary battery is in the fully discharged state, the compaction density of the positive electrode film layer is 2.51 g/cm$^3$ to 2.73 g/cm$^3$, and in the section of the positive electrode film layer in the thickness direction of the electrode plate, a porosity of the positive electrode film layer is 10% to 22%.

In any of embodiments, when the lithium-ion secondary battery is in the fully discharged state, the compaction density of the positive electrode film layer is 2.55 g/cm$^3$ to 2.70 g/cm$^3$, and in the section of the positive electrode film layer in the thickness direction of the electrode plate, the porosity of the positive electrode film layer is 10% to 20%.

In this embodiment of the present application, a lower porosity in the section of the positive electrode film layer indicates, on one hand, better graduation of large, middle, and small particles in the positive electrode film layer, so that the compaction density is high. On the other hand, after the same graduation and rolling pressure, if the porosity is low, it indicates easy slippage between the particles, thereby reducing the risks of overpressure and stress concentration of the film layer, further reducing a demolding probability of a positive electrode diaphragm in a long cycle process, and facilitating improving a long-cycle performance of the battery.

In any of embodiments, the positive electrode plate includes a base coating layer, and the base coating layer is arranged between the positive electrode film layer and the current collector; and the base coating layer includes carbon-based particles, and a distribution density of the carbon-based particles having a particle size greater than 100 nm in the base coating layer is less than or equal to 10 pcs/10 μm.

The base coating layer facilitates improving the conductivity and an adhesion force between the positive electrode film layer and the current collector, which reduces demolding of the positive electrode film layer from the current collector in the cycle process, thereby improving the kinetics performance of the battery. In the electrode plate with the high compaction density in this embodiment of the present application, the distribution density of the carbon-based particles with the particle sizes greater than 100 nm in the base coating layer is controlled to be less than or equal to 10 pcs/10 μm, which facilitates reducing a probability that the current collector is damaged in the electrode plate with the high compaction density, thereby further improving an extreme compaction density of the positive electrode plate.

In any of embodiments, the positive electrode plate includes a base coating layer, and the base coating layer is arranged between the positive electrode film layer and the current collector; and the compaction density of the positive electrode plate in the fully discharged state is greater than or equal to 2.4 g/cm$^3$, and a single-side thickness of the base coating layer is 1 μm to 4 μm.

In any of embodiments, the positive electrode plate includes a base coating layer, and the base coating layer is arranged between the positive electrode film layer and the current collector; and the compaction density of the positive electrode plate in the fully discharged state is greater than or equal to 2.5 g/cm$^3$, and a single-side thickness of the base coating layer is 2 μm to 4 μm.

With the increase of the compaction density of the electrode plate, a compressing effect of the lithium-containing phosphate material (for example, having a particle size greater than 1 μm) of the large particles in the positive electrode film layer on the base coating layer is more prominent. Therefore, stress is prone to concentration at the position of the large particles, and even passes through the base coating layer to damage the current collector. Increasing a thickness of the base coating layer facilitates alleviating a stress concentration phenomenon in the electrode plate, which further increases the extreme compaction density of the electrode plate.

A second aspect of the present application provides a battery apparatus, including the lithium-ion secondary battery provided in the first aspect of the present application. The battery apparatus includes at least one of a battery module, a battery pack, and an energy storage battery.

A third aspect of the present application provides an electric apparatus, and the electric apparatus includes the lithium-ion secondary battery provided in the first aspect of the present application or the battery apparatus provided in the second aspect of the present application.

A fourth aspect of the present application further provides a preparation method for a positive electrode active material: obtaining a mixed raw material including a carbon source, a lithium source, an iron source, and a phosphorus source, where the carbon source includes polyethylene glycol, and the iron source includes ferrous iron; and obtaining a mixed slurry after grinding in a solvent, where a volume distribution particle size $Dv_{50}$ of particles in the mixed slurry is 1 μm to 4 μm; obtaining a precursor powder after drying the mixed slurry; and sintering the precursor powder to obtain the positive electrode active material, where the sintering includes at least two segments of constant-temperature sintering, and a sintering temperature of a high-temperature segment is 750° C. to 800° C.

An area proportion of large-sized particles on a surface of a positive electrode film layer prepared using the positive electrode active material prepared by the preparation method is small, and the positive electrode active material has a high graphitization degree, so that a compaction density of the electrode plate can be easily improved by slippage between particles, which facilitates improving the energy density of the battery while improving the kinetics performance of the battery.

A fifth aspect of the present application provides a preparation method for a positive electrode plate. The preparation method includes: sequentially adding a binder, a conductive agent, and the positive electrode active material prepared by the preparation method of the fourth aspect for dry mixing, then adding a solvent, and after stirring, obtaining a final slurry; and transferring and coating the final slurry to at least one side of a current collector, and then performing oven drying and hot pressing to obtain the positive electrode plate.

In any of embodiments, the stirring includes pre-stirring and main stirring, a stirring speed of the pre-stirring is lower than that of the main stirring, a revolution speed of the pre-stirring is 20 rpm to 30 rpm, a rotation speed of the pre-stirring is 450 rpm to 550 rpm, and a period of the pre-stirring is 10 min to 20 min.

In any of embodiments, the hot pressing includes at least three times of hot rolling, hot roller pressures are sequentially increased, and the hot roller pressures are sequentially 20 tons to 50 tons, 50 tons to 70 tons, and 70 tons to 90 tons;

and a hot roller temperature is 40° C. to 80° C., before entering hot roller compaction for the first time, the electrode plate is heated, and a temperature of the heating is 40° C. to 50° C.

The above hot pressing process is used in combination with the positive electrode active material prepared by the preparing method of the fourth aspect, which is beneficial to further reducing the porosity of the section of the positive electrode film layer, thereby increasing the extreme compaction density of the electrode plate, and improving the energy density of the battery.

DESCRIPTION OF REFERENCE NUMERALS

Figure 1:
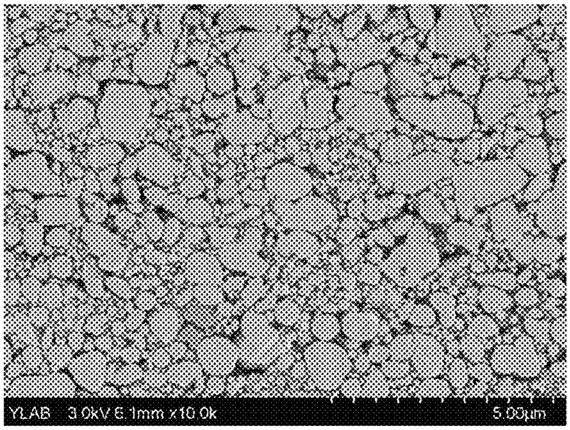
FIG. 1 is a scanning electron microscope image of a section of a positive electrode film layer in a thickness direction of an electrode plate according to an embodiment of the present application.

1: battery pack; 2: upper box body; 3: lower box body; 4: battery module; 5: lithium-ion secondary battery; 51: housing; 52: electrode assembly; and 53: top cover assembly.

DETAILED DESCRIPTION

Hereinafter, embodiments that specifically disclose a lithium-ion secondary battery, a battery apparatus, an electric apparatus, a preparation method for a positive electrode active material, and a preparation method for a positive electrode plate of the present application will be described in detail with reference to the drawings as appropriate. However, there may be cases where unnecessary detailed descriptions are omitted. For example, there are cases where detailed descriptions of well-known matters and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

The "ranges" disclosed in the present application are defined in the form of lower and upper limits. A given range is defined by selecting a lower limit and an upper limit, and the selected lower and upper limits define the boundaries of the particular range. The range defined in this way may include or may not include end values, and may be arbitrarily combined, that is, any lower limit can be combined with any upper limit to form a range. For example, if the ranges of 60 to 120 and 80 to 110 are listed for particular parameters, it is to be understood that the ranges of 60 to 110 and 80 to 120 are also expected. Additionally, if minimum range values of 1 and 2 are listed and maximum range values of 3, 4, and 5 are listed, the following ranges: 1 to 3, 1 to 4, 1 to 5, 2 to 3, 2 to 4, and 2 to 5 may all be contemplated. In the present application, unless otherwise specified, the numerical range "a-b" represents an abbreviated representation of any combination of real numbers between a and b, where a and b are both real numbers. For example, a numerical range "0 to 5" indicates that all real numbers between "0 to 5" have been listed herein, and "0 to 5" is only an abbreviated representation of combinations of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined to form a new technical solution. In addition, the technical solution shall be considered to be included in the disclosed content of the present application.

Unless otherwise specified, all technical features and optional technical features of the present application may be combined with each other to form a new technical solution. In addition, the technical solution shall be considered to be included in the disclosed content of the present application.

Unless otherwise specified, all steps of the present application may be performed sequentially or randomly, and preferably sequentially. For example, that the method includes step (a) and step (b) indicates that the method may include step (a) and step (b) performed sequentially, or the method may include step (b) and step (a) performed sequentially. For example, that the method may further include step (c) indicates that step (c) may be added to the method in any order. For example, the method may include step (a), step (b), and step (c), may include step (a), step (c), and step (b), or may include step (c), step (a), and step (b).

In the present application, the term "a plurality of" and "a variety of" means two or more.

Unless otherwise specified, terms used in the present application have well-known meanings generally understood by those skilled in the art.

Unless otherwise specified, numerical values of parameters mentioned in the present application may be tested using various test methods commonly used in the art, for example, testing may be performed according to a test method provided in the embodiments of the present application. Unless otherwise specified, the test temperatures of the parameters are all 25° C.

A battery mentioned in an embodiment of the present application may be a single physical module including one or more lithium-ion secondary batteries to provide a higher voltage and a higher capacity. For example, the battery mentioned in the present application may include a lithium-ion secondary battery, a battery module, a battery pack, or the like.

Figure 2:
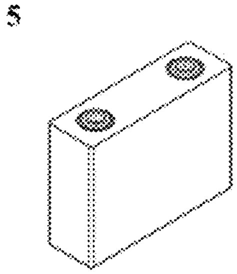
FIG. 2 is a schematic diagram of a lithium-ion secondary battery according to an embodiment of the present application.

The lithium-ion secondary battery is a smallest unit constituting the battery, and can achieve functions of charge and discharge independently. The lithium-ion secondary battery may be in a cylindrical shape, a cuboid shape, or in other shapes, without limitation in the embodiments of the present application. For example, FIG. 2 shows a lithium-ion secondary battery 5 having a cuboid structure as an example.

The lithium-ion secondary battery includes an electrode assembly and an electrolyte.

The lithium-ion secondary battery may also include an outer package which may be used for encapsulating the electrode assembly and the electrolyte. The outer package may be a hard case, for example, a hard plastic case, an aluminum case, or a steel case. The outer package may alternatively be a soft package, for example, a pouch type soft package. The soft package may be made from plastic, for example, one or more of polypropylene (PP), polybutylene terephthalate (PBT), and polybutylene succinate (PBS).

Figure 3:
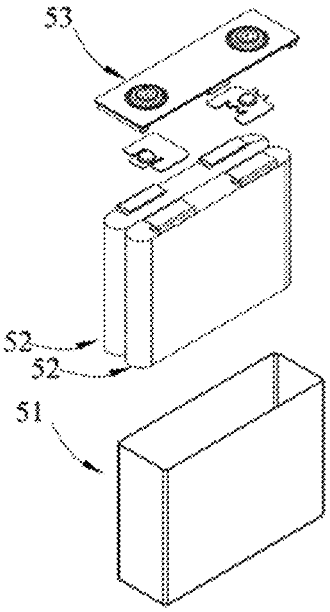
FIG. 3 is an exploded schematic diagram of the lithium-ion secondary battery according to an embodiment of the present application.

In some embodiments, as shown in FIG. 3, the outer package may include a housing 51 and a cover plate 53. The housing 51 may include a bottom plate and side plates connected to the bottom plate. The bottom plate and the side plates define an accommodating cavity. The housing 51 has an opening in communication with the accommodating cavity, and the cover plate 53 is configured to cover the opening to close the accommodating cavity. The electrode assembly 52 is encapsulated in the accommodating cavity. The number of electrode assemblies 52 included in the lithium-ion secondary battery 5 may be one or more, and may be determined according to requirements.

The electrode assembly usually includes a positive electrode plate and a negative electrode plate. The negative electrode plate is an electrode on which a reaction of incorporating lithium ions or lithiation during charge and releasing lithium or delithiation during discharge occurs. The positive electrode plate is an electrode on which a reaction of releasing lithium ions or delithiation during charge and incorporating lithium or lithiation during discharge occurs.

When there are a plurality of lithium-ion secondary batteries, the plurality of lithium-ion secondary batteries are connected in series, parallel, or series-parallel using bus components. In some embodiments, the battery may be a battery module. When there are a plurality of lithium-ion secondary batteries, the plurality of lithium-ion secondary batteries are arranged and fixed to form a battery module. In some embodiments, the battery may be a battery pack. The battery pack includes a box and a lithium-ion secondary battery, and the lithium-ion secondary battery or the battery module is accommodated in the box. In some embodiments, the box may be used as a part of a chassis structure of a vehicle. For example, a part of the box may be at least a part of a floor of the vehicle, or a part of the box may be at least a part of a cross beam and a longitudinal beam of the vehicle.

In some embodiments, the battery may be an energy storage apparatus. The energy storage apparatus includes an energy storage container, an energy storage electric cabinet, and the like.

Figure 4:
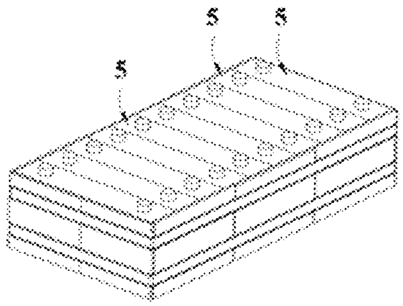
FIG. 4 is a schematic diagram of a battery module according to an embodiment of the present application.

In some embodiments, the lithium-ion secondary battery may be assembled into a battery module. There may be a plurality of lithium-ion secondary batteries included in the battery module, and the specific number may be adjusted according to the application and capacity of the battery module. FIG. 4 is a schematic diagram of a battery module 4 as an example. As shown in FIG. 4, in the battery module 4, a plurality of lithium-ion secondary batteries 5 may be sequentially arranged in a length direction of the battery module 4. Certainly, the lithium-ion secondary batteries may alternatively be arranged in any other manners. The plurality of lithium-ion secondary batteries 5 may further be fixed by fasteners.

Optionally, the battery module 4 may further include a casing having an accommodating space, and the plurality of lithium-ion secondary batteries 5 are accommodated in the accommodating space.

In some embodiments, the above battery module may further be assembled into a battery pack, and the number of battery modules included in the battery pack may be adjusted according to the application and capacity of the battery pack.

Figure 5:
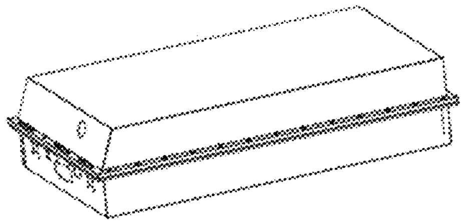
FIG. 5 is a schematic diagram of a battery pack according to an embodiment of the present application.
Figure 6:
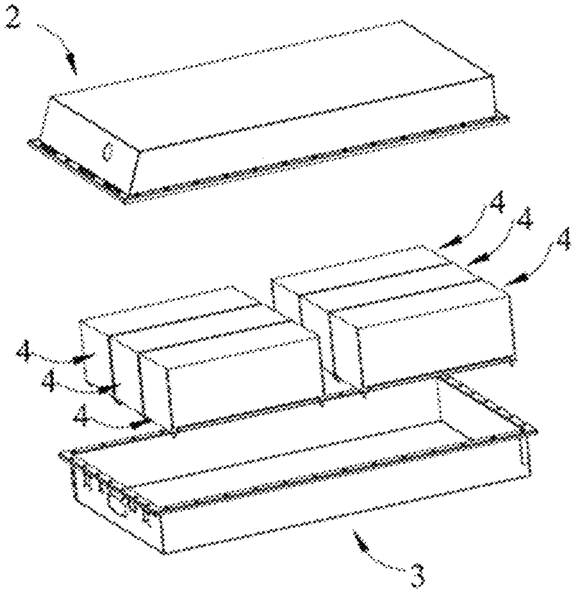
FIG. 6 is an exploded schematic diagram of the battery pack as shown in FIG. 5.

FIG. 5 and FIG. 6 are schematic diagrams of a battery pack 1 as an example. As shown in FIG. 5 and FIG. 6, the battery pack 1 may include a box and a plurality of battery modules 4 arranged in the box. The box includes an upper box body 2 and a lower box body 3. The upper box body 2 is used for covering the lower box body 3 to form an enclosed space for accommodating the battery modules 4. The plurality of battery modules 4 may alternatively be arranged in the box in any manner.

Because of the features of stable structure, good safety, and long cycle life, a lithium-containing transition metal phosphate material has been widely used in a lithium-ion battery. However, it has the problems of low electronic conductivity and low stacking efficiency, further leading to that it is difficult to effectively increase the loading capacity of the lithium-containing transition metal phosphate in per unit volume of the battery, and failing to meet the requirement of a battery with a high energy density.

To further improve the energy density of the battery and improve the compaction density of the electrode plate, a common manner in the industry is to enlarge graduation of particles in the electrode plate. To improve the graduation of the particles, the size or proportion of large particles needs to be increased. However, researches indicate that after the size or proportion of the large particles in the electrode plate exceed a particular range, the kinetics performance of the battery may be compromised. How to obtain a battery that achieves a balance between the energy density and the kinetics performance is a technical problem that needs to be resolved urgently in the art.

A first aspect of the present application provides a lithium-ion secondary battery, and the lithium-ion secondary battery includes a positive electrode plate, a negative electrode plate, and an electrolyte, where the positive electrode plate includes a positive electrode current collector and a positive electrode film layer arranged on at least one side of the positive electrode current collector. The positive electrode film layer includes a positive electrode active material, and the positive electrode active material includes lithium-containing transition metal phosphate particles with a surface at least partially provided with a carbon coating material. In a section of the positive electrode film layer in a thickness direction of the electrode plate, an area proportion of particles having a particle size greater than or equal to 1.5 μm is greater than or equal to 8.0% and less than or equal to 20.0%. In a cumulative distribution curve of a C value of a graphitization degree obtained in a mapping mode by a laser confocal microscope Raman spectrometer for the positive electrode film layer, a median $C_{50}$ of the graphitization degree is greater than or equal to 0.95 and less than or equal to 1.20, where the C value of the graphitization degree is $I_G/I_D$, $I_G$ represents a G-band intensity of a Raman spectrum at 1580±100 $cm^{-1}$, and Ip represents a D-band intensity of the Raman spectrum at 1350±100 $cm^{-1}$.

In the section of the positive electrode film layer in the thickness direction of the electrode plate, the area proportion of the particles having the particle size greater than or equal to 1.5 μm is less than 8%. Therefore, it is difficult to achieve a high compaction density of the positive electrode plate. In the section of the positive electrode film layer in the thickness direction of the electrode plate, the area proportion of the particles having the particle size greater than or equal to 1.5 μm exceeds 20%. Although it facilitates achieving the high compaction density of the positive electrode plate, a contact area between an electrolyte solution and the positive electrode active material may be reduced, diffusion of lithium ions to the positive electrode film layer is hindered, and a diffusion path of the lithium ions in particles is increased. Consequently, the electrode plate is locally polarized seriously, the resistance of the battery is increased, and the kinetics performance of the battery is obviously deteriorated.

By controlling the area proportion of the particles having the particle size greater than or equal to 1.5 μm in the positive electrode film layer to be greater than or equal to 8.0% and less than or equal to 20.0%, a significant buckets effect brought by large-sized particles can be reduced, which facilitates keeping the resistance of a battery at a relatively low level, thereby improving the kinetics performance of the battery. However, this limits further improvement of a compaction density of the electrode plate. In an embodiment of the present application, by further controlling the median $C_{50}$ of the graphitization degree to be greater than or equal to 0.95 and less than or equal to 1.20, the graphitization degree of the particles in the positive electrode film layer is improved, and a crystallization degree of a carbon layer on the surface of the particles is increased, so that particle slippage can be easily implemented in a process of rolling the positive electrode active material to form a film, and an increase in a compaction density of the positive electrode film layer is further obtained by the characteristic of easy slippage of the particles, thereby achieving a balance between the kinetics performance and the energy density of the battery.

In the present application, the term “particle” refers to a particle having a complete boundary that can be identified in the field of view of the positive electrode film layer at a particular magnification, for example, 10,000 X. A defect or a scratch may exist in the particle, but a complete boundary sufficient to divide the particle cannot be identified inside the particle.

In some embodiments, in the section of the positive electrode film layer in the thickness direction of the electrode plate, the area proportion of the particles having the particle size greater than or equal to 1.5 μm is optionally 8.0%, 9.0%, 10.0%, 11.0%, 12.0%, 13.0%, 14.0%, 15.0%, 16.0%, 17.0%, 18.0%, 19.0%, and 20.0%, or in a value range between any two of the values.

A statistics collection manner of areas of the particles in the section of the positive electrode film layer in the thickness direction of the electrode plate is specifically as follows. The positive electrode film layer is segmented by an argon ion beam in the thickness direction of the electrode plate (as an example, a device model: Leica electron microscope TIC 3×CP, a working voltage: 6 kV, and working duration: 6 h may be selected), and after the section is exposed, the section of the positive electrode film layer in the thickness direction of the electrode plate is observed using a scanning electron microscope (as an example, a device model: Hitachi SU8230, a working voltage: 3 kV, a beam current: high, a probe model: U (LA100), and a working distance <5 mm may be selected). An image is collected using a field emission scanning electron microscope in a secondary electron mode at a non-edge position (after an edge of the electrode plate is observed under the scanning electron microscope, the field of view is adjusted to a central part of a sample) in the section of the positive electrode film layer. An electron microscope image is captured at a magnification of 10 k, and particles in the electron microscope image are analyzed using ImageJ software (1.46 r, win64 version). A method for using the ImageJ software is specifically as follows: the scanning electron microscope image to be analyzed is loaded, as shown in FIG. 1; Cellpose plug-in software therein is used to identify the particle, and manual calibration is performed on this basis; Image J is used to read and count data. A specific method for identifying the particle using the Cellpose plug-in software therein is as follows: After a segmentation diameter parameter (diameter in a Segmentation module) is set to 15 pixels, “run cyto3” is clicked to perform particle identification, and a particle that is in the image, but is not identified by the software, or that is not completely identified by the software, or that is identified with an error is manually identified. The particle that is in the image, but is not identified by the software, or that is not completely identified by the software, or that is identified with an error mainly includes the following conditions: 1. Because the particle is excessively large or has a scratch on the surface, the particle cannot be identified or cannot be completely identified; 2. In the segmentation process by the argon ion beam, a scratch may be generated on the surface of the particle, and in an identification process by the software, the scratch may be incorrectly determined as a particle boundary, thereby generating an identification error; 3. Because the particle is excessively small, the particle fails to be successfully identified; 4. The particle is located at an edge of the field of view of an electron microscope, an inside of the particle is intersected by the edge, a topography is not completely presented, and a part is identified instead of an entire particle, causing an identification error. The above particle that is not identified or identified with an error is manually calibrated, and a specific process is as follows: large particles that are located on peripheral edges of the scanning electron microscope and fail be completely displayed are deleted; whether there is a gap scratch inside another particle that is not identified or identified with an error is determined, and if there is no gap scratch inside the particle, it is determined that the particle is one particle, and the particle is manually identified according to a particle boundary observed manually; in response to that there is a gap scratch inside the particle, whether the gap scratch penetrates through the particle is determined, and if the gap scratch does not penetrate through the particle, it is determined that the particle is one particle, and manual identification is performed; in response to that the gap scratch penetrates through the particle, whether the gap scratch is linear or irregular is determined; in response to that the gap scratch is irregular, it is determined that the gap scratch is a boundary between particles, and particle division is performed along the boundary; in response to that the gap scratch is linear, contrast comparison is performed; and in response to that the contrast comparison is not obvious and there is no crack feeling, it is determined that the gap scratch is a scratch, and the particle is identified as one particle; and in response to that the contrast comparison is strong and there is a crack feeling, it is determined that the gap scratch is a boundary between particles, and the particle is identified as two particles. Information unrelated to the particle in an automatic processing process of the image is deleted after the manual identification, that is, determination and identification of the particle in the image are completed.

The image with the determination and identification of the particle completed is imported into ImageJ software for analysis, scale setting is completed according to the scanning electron microscope image, and the particle size of the particle and the area of the particle in the image are analyzed using "Feret diameter" and "Area" analysis functions. According to a software manual (ImageJ User Guide IJ 1.46r), the "Feret" parameter obtained through analysis represents a maximum distance between all parallel lines in the two-dimensional projection of the particle, and is used to represent the particle size of the particle. The "Area" parameter represents a pixel area of the particle, and is used to represent the area of the particle. Particles having a particle size less than 50 nm have a relatively large error in a statistical process, and are difficult to be accurately identified. In addition, a conductive agent usually has a particle size less than 50 nm, which may generally have a relatively large error on a statistical result. Therefore, the particles having the particle size less than 50 nm are not counted in the statistical process of the particle size of the present application, and statistical data of corresponding particles with the Area displayed as "NaN" is deleted. According to the above method, to satisfy the number of samples having statistical significance, not less than 10 scanning electron microscope images whose fields of view do not overlap are collected for each electrode plate, and areas of not less than 5000 particles are counted. A sum of "Area" parameters of the particles having the particle size greater than or equal to 1.5 μm and a sum of "Area" parameters of all the particles are calculated and respectively used as an area of the particles having the particle size greater than or equal to 1.5 μm and a total area of the counted particles. A sum of areas of the particles having the particle size greater than or equal to 1.5 μm is divided by the total area of the counted particles to be used as an area proportion of the particles having the particle size greater than or equal to 1.5 μm in the section of the positive electrode film layer in the thickness direction of the electrode plate.

In a compaction process, the positive electrode film layer is compacted in the thickness direction. Therefore, compared with the surface of the positive electrode film layer, the section of the positive electrode film layer in the thickness direction of the electrode plate is more capable of reflecting a real compaction status, in terms of a spatial scale, of the particles inside the film layer. In the section of the positive electrode film layer in the thickness direction of the electrode plate, the area proportion of the particles having the particle size greater than or equal to 1.5 μm can directly reflect the proportion relationship between the area of particles in the particle size segment and the entire particle area, thereby reflecting the distribution status of the particles in the particle size segment.

It may be understood that particles in the section of the positive electrode film layer in the thickness direction of the electrode plate, especially particles having a particle size above 50 nm, mainly come from the positive electrode active material. Therefore, in this embodiment of the present application, the distribution status of the lithium-containing transition metal phosphate particles in the positive electrode film layer in the electrode plate can be accurately and objectively reflected by observation and counting on the area of the particles in the section of the positive electrode film layer.

In the prior art, the particle size of the positive electrode active material is usually counted through a Malvern laser diffraction method using a laser particle size analyzer. However, researches of the applicant indicate that since the particles of the lithium-containing transition metal phosphate are prone to agglomeration, and usually, the particle size of the particle agglomerate thereof is measured by a test result obtained by the Malvern laser diffraction method according to a laser scattering principle, the particle size of the particles in the positive electrode active material cannot be truly reflected, and the dispersion state of the positive electrode active material in the film layer cannot reflected, either, because the degree of dispersion of the positive electrode active material in the film layer increases to some extent in the slurrying and film forming and rolling processes. The test result obtained by the Malvern laser diffraction method is affected by the particle size, a specific surface area, and an agglomeration degree of the positive electrode active material. Compared with a true dispersion status in the electrode plate, the number of large particles obtained by the test is lower than an actual value, and the number of small particles obtained by the test is higher than an actual value. Therefore, the particle size obtained by the Malvern laser diffraction method test cannot be equivalent to or analogized to the particle size obtained by statistics collection in this embodiment of the present application.

A person skilled in the art may regulate the particle size of the particles using any known process. As an example, a growth rate and time of the positive electrode material are controlled by regulating a temperature and time in a preparing process of the positive electrode material. A raw material is processed into a target particle size distribution range by the mechanical force action of a crushing and ore grinding process, to adjust the particle size of the particle; and particle size separation is performed on a particle system using a sieving and classifying device, so as to obtain a particle size ratio satisfying requirements; a feeding rate is accurately controlled, and residence time and a force-bearing state of the particles in the device are adjusted, which also facilitates regulating the particle size of the particle.

The lithium-containing transition metal phosphate refers to a phosphate material including a lithium element and a transition metal element, which may be detected in any well-known manner in the art. For example, the detection may be performed by an X-ray diffractometer (XRD), an energy spectrum analyzer, and an inductively coupled plasma-optical emission spectrometer (ICP-OES) used in combination. As an example, the lithium-containing transition metal phosphate includes, but is not limited to, lithium iron phosphate, lithium manganese iron phosphate, and a doping material thereof.

The carbon coating material arranged on at least a part of the surface of the lithium-containing transition metal phosphate may be detected in any well-known manner in the art. As an example, the carbon coating material arranged on at least a part of the surface of the lithium-containing transition metal phosphate may be observed by a combination of a transmission electron microscope and an energy spectrum analyzer to represent the lithium-containing transition metal phosphate. It should be noted that an element in the carbon coating material is not limited to a carbon element, and may further include another non-carbon element. A carbon coating layer including the carbon coating material is not limited to being film-shaped, and further includes an island-shaped, an irregular-shaped, or a discontinuous coating layer.

In some embodiments, in the cumulative distribution curve of the C value of the graphitization degree obtained in the mapping mode by the laser confocal microscope Raman spectrometer for the positive electrode film layer, the median $C_{50}$ of the graphitization degree is greater than or equal to 0.95 and less than or equal to 1.20, where the C value of the graphitization degree is $I_G/I_D$, $I_G$ represents the G-band intensity of the Raman spectrum at the position of 1580±100 $cm^{-1}$, and $I_D$ represents the D-band intensity of the Raman spectrum at the position of 1350±100 $cm^{-1}$.

In the present application, the C value of the graphitization degree of the positive electrode film layer may be obtained in the mapping mode by the laser confocal microscope Raman spectrometer. As an example, specifically, the laser confocal microscope Raman spectrometer (a high-precision Renishaw laser confocal microscope Raman spectrometer) is used. An excitation wavelength of 532 nm is selected, an appropriate amount of the positive electrode film layer is taken so as to perform mapping on a surface thereof or the section in the thickness direction of the electrode plate, and a mapping region is 45 μm×45 μm and is divided into 10×10 grids. With a grid vertex as a test point, and a step width of 5 μm, a total number of mapped points is 100, so that C values of different sites and a cumulative distribution curve of a C value of a mapping region are obtained.

The positive electrode film layer in the present application may be a freshly prepared positive electrode film layer, or may be a positive electrode film layer disassembled from a battery. A surface of the positive electrode film layer disassembled from the battery unavoidably has a residual electrolyte salt. To improve testing accuracy, preferably, the section of the positive electrode film layer in the thickness direction of the electrode plate is mapped, to represent the graphitization degree of the positive electrode film layer.

The C value of the graphitization degree of the positive electrode film layer is obtained using a ratio of the G-band intensity to the D-band intensity of the Raman spectrum, and a G-band is at the position of 1580±100 $cm^{-1}$, representing a carbon $sp^2$ hybridized structure; a D-band is at the position of 1350±100 $cm^{-1}$, representing a disordered structure of carbon, where disordered represents an irregular arrangement manner between carbon atoms in the structure. In a graphite crystal, carbon atoms in the same layer form covalent bonds by $sp^2$ hybridization, and Van der Waals' force exists between layers, so that carbon of the graphite structure is prone to slippage. Therefore, the C value may represent the graphitization degree of the positive electrode film layer. It may be understood that the graphitization degree in the positive electrode film layer is mainly derived from a carbon material on which graphitization processing has been performed in the positive electrode film layer, namely, the carbon coating layer of the positive electrode active material. Although a carbon nanotube conductive agent rich in the $sp^2$ hybridized structure also has relatively high $I_G/I_D$, because of a small adding content and a small tube diameter thereof, addition thereof in the positive electrode film layer exhibits an extreme value in the Rama mapping test of the positive electrode film layer and does not affect the $C_{50}$ of the graphitization degree in the positive electrode film layer.

Therefore, the graphitization degree of the positive electrode film layer can also be used for representing the graphitization degree of the positive electrode active material. A higher graphitization degree of carbon on the surface of the positive electrode active material indicates a higher proportion of carbon of the graphite structure in the positive electrode film layer, so that the particles are more likely to slip in a rolling process with the help of the carbon structure having a high graphitization degree in the coating layer. Therefore, the compaction density of the electrode plate can be improved under a low rolling pressure.

The cumulative distribution curve of the C value of the graphitization degree refers to a curve obtained by arranging the obtained at least 100 C values in ascending order, using the graphitization degree as a horizontal axis and a cumulative quantity ratio as a vertical axis. $C_{50}$ is a C value corresponding to a case in which the cumulative quantity ratio of the vertical axis in the cumulative distribution curve of the C value of the graphitization degree is 50%. Compared with a point value, the median $C_{50}$ of the graphitization degree can reflect an overall graphitization degree, that is, an easy slippage degree, of the particles in the positive electrode film layer. Compared with a mean value, impacts of an extreme value in a test process can be reduced, and confidence of a test result can be improved.

In some embodiments, in the cumulative distribution curve of the C value of the graphitization degree obtained in the mapping mode by the laser confocal microscope Raman spectrometer for the positive electrode film layer, the median $C_{50}$ of the graphitization degree is optionally 0.95, 0.96, 0.97, 0.98, 0.99, 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, and 1.20, or in a value range between any two of the values.

A person skilled in the art may regulate the graphitization degree of the particles of the active material using any known process. As an example, the graphitization degree of the particles of the active material can be adjusted by regulating a carbon source, optimizing a nucleation process, and regulating a sintering temperature, sintering time, a sintering pressure, and a sintering atmosphere. A higher graphitization degree of carbon on the surface of the positive electrode active material indicates a higher proportion of carbon of the graphite structure in the positive electrode film layer, and the particles are more likely to slip with the help of the carbon structure having a high graphitization degree in the coating material. Therefore, the compaction density of the electrode plate can be improved.

In some embodiments, the median $C_{50}$ of the graphitization degree in the positive electrode film layer is 0.97 to 1.13, optionally, 1.00 to 1.10.

The median $C_{50}$ of the graphitization degree of the positive electrode film layer is within the above range, which facilitates further improving a degree of easy slippage between the particles, so as to offset insufficient gradation caused by fewer large particles in the positive electrode film layer, and further improving the compaction density of the electrode plate while maintaining the high kinetics performance of the battery, thereby achieving a balance between the kinetics performance and the energy density of the battery.

In some embodiments, in the cumulative distribution curve of the C value of the graphitization degree obtained in the mapping mode by the laser confocal microscope Raman spectrometer for the positive electrode film layer, a concentration degree $(C_{90}-C_{10})/C_{50}$ of the C value is 0.01 to 0.04.

Refer to what is described above, the rest can be deduced by analogy, Coo is a C value corresponding to a situation in which the cumulative quantity proportion of the vertical axis in the cumulative distribution curve of the C value of the graphitization degree is 90%, and $C_{10}$ is a C value corresponding to a situation in which the cumulative quantity proportion of the vertical axis in the cumulative distribution curve of the C value of the graphitization degree is 10%. The concentration degree of the C value is represented by $(C_{90}-C_{10})/C_{50}$. $(C_{90}-C_{10})/C_{50}$ not only reflects the magnitude of most C values, but also demonstrates robustness against outliers, while reflecting the distribution width of the graphitization degree of the particles in the positive electrode film layer. A small concentration degree of the C value of the positive electrode film layer indicates a small distribution width and good concentricity of the graphitization degree of the carbon on the surface of the positive electrode active material.

In some embodiments, in the cumulative distribution curve of the C value of the graphitization degree obtained in the mapping mode by the laser confocal microscope Raman spectrometer for the positive electrode film layer, the concentration degree $(C_{90}-C_{10})/C_{50}$ of the C value is optionally 0.01, 0.02, 0.03, and 0.04, or in a value range between any two of the values.

The concentration degree of the C value of the positive electrode film layer is 0.01 to 0.04, indicating that the graphitization degree of coating carbon on a surface of the positive electrode active material is relatively consistent, which means that the positive electrode active material has good coating uniformity and consistency, so that slippage resistance caused by inconsistency of the graphitization degree of the particles in the positive electrode active material and further caused local stress concentration can be reduced. Therefore, by uniform slippage between the particles of the positive electrode active material, the electrode plate can achieve a relatively high compaction density as a whole under a relatively low rolling pressure, which further improves the compaction density of the electrode plate and the energy density of the battery while maintaining the good kinetics performance of the battery.

In some embodiments, in the cumulative distribution curve of the C value of the graphitization degree obtained in the mapping mode by the laser confocal microscope Raman spectrometer for the positive electrode film layer, a concentration degree $(C_{90}-C_{10})/C_{50}$ of the C value is 0.02 to 0.04.

The concentration degree $(C_{90}-C_{10})/C_{50}$ of the C value is within the above range, which facilitates further improving the consistency of the graphitization degree of the carbon on the surface of the positive electrode active material, thereby improving the degree of slippage between the particles, and further improving the compaction density of the electrode plate and the energy density of the battery while maintaining the good kinetics performance of the battery.

In some embodiments, in the cumulative distribution curve of the C value of the graphitization degree obtained in the mapping mode by the laser confocal microscope Raman spectrometer for the positive electrode film layer, $C_{90}$ of the graphitization degree is 1.0 to 1.3, optionally, 1.02 to 1.15.

In some embodiments, in the cumulative distribution curve of the C value of the graphitization degree obtained in the mapping mode by the laser confocal microscope Raman spectrometer for the positive electrode film layer, $C_{90}$ of the graphitization degree is optionally 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, and 1.3, or in a value range between any two of the values.

The $C_{90}$ of the graphitization degree is within the above range and is relatively close to the median $C_{50}$ of the graphitization degree, indicating that a distribution interval of the graphitization degree of the positive electrode film layer is narrow, which facilitates uniform slippage between the particles so as to improve the compaction density of the positive electrode plate.

In some embodiments, in the cumulative distribution curve of the C value of the graphitization degree obtained in the mapping mode by the laser confocal microscope Raman spectrometer for the positive electrode film layer, $C_{10}$ of the graphitization degree is 0.92 to 1.1, optionally, 0.98 to 1.08.

In some embodiments, in the cumulative distribution curve of the C value of the graphitization degree obtained in the mapping mode by the laser confocal microscope Raman spectrometer for the positive electrode film layer, $C_{10}$ of the graphitization degree is optionally 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, and 1.1 or in a value range between any two of the values.

The $C_{10}$ of the graphitization degree is within the above range, indicating that different positions in the positive electrode film layer all have a relatively high graphitization degree, which facilitates uniform slippage of the particles, thereby reducing an occurrence probability of a local stress concentration phenomenon, and further improving the compaction density of the electrode plate.

In some embodiments, in the section of the positive electrode film layer in the thickness direction of the electrode plate, an area proportion of particles having a particle size of 1.5 μm to 5 μm is 9.0% to 20.0%.

In some embodiments, in the section of the positive electrode film layer in the thickness direction of the electrode plate, the area proportion of the particles having the particle size of 1.5 μm to 5 μm is optionally 9.0%, 10.0%, 11.0%, 12.0%, 13.0%, 14.0%, 15.0%, 16.0%, 17.0%, 18.0%, 19.0%, and 20.0%, or in a value range between any two of the values.

In the section of the positive electrode film layer in the thickness direction of the electrode plate, the area proportion of the particles having the particle size of 1.5 μm to 5 μm can be tested by referring to the above-described manner. In the section of the positive electrode film layer in the thickness direction of the electrode plate, a sum of areas of the particles having the particle size of 1.5 μm to 5 μm is divided by the total area of the counted particles to be used as the area proportion of the particles having the particle size of 1.5 μm to 5 μm in the section of the positive electrode film layer in the thickness direction of the electrode plate.

In the section of the positive electrode film layer in the thickness direction of the electrode plate, the area proportion of the particles having the particle size of 1.5 μm to 5 μm is within the above range, which can further reduce a hindering effect of the large-sized particles on the surface of the electrode plate on infiltration and diffusion of an electrolyte solution in the positive electrode film layer, thereby improving consistency of a diffusion rate of lithium ions in the particles of the positive electrode active material, reducing local polarization, and improving the kinetics performance of the battery.

In some embodiments, in the section of the positive electrode film layer in the thickness direction of the electrode plate, an area proportion of particles having a particle size of 1.5 μm to 5 μm is 10.0% to 20.0%.

In a process of improving gradation of the particles and increasing the size or proportion of the large particles, the particles having the particle size of 1.5 μm to 5 μm are unavoidably introduced. The area proportion of the particles having the particle size of 1.5 μm to 5 μm is within the above range, which facilitates improving the compaction degree of the electrode plate while taking the kinetics performance of the battery into consideration.

In some embodiments, in the section of the positive electrode film layer in the thickness direction of the electrode plate, an area proportion of particles having a particle size greater than or equal to 5 μm is 0.

In the section of the positive electrode film layer in the thickness direction of the electrode plate, the area proportion of the particles having the particle size greater than or equal to 5 μm can be tested by referring to the above-described manner. In the section of the positive electrode film layer in the thickness direction of the electrode plate, a sum of areas of the particles having the particle size greater than or equal to 5 μm is divided by the total area of the counted particles to be used as the area proportion of the particles having the particle size greater than or equal to 5 μm in the section of the positive electrode film layer in the thickness direction of the electrode plate.

Researches indicate that the particles having the particle size greater than or equal to 5 μm in the positive electrode film layer may significantly worsen the infiltration of the electrolyte solution in the positive electrode film layer and the diffusion thereof in the particles of the active material, and when the area proportion of the particles having the particle size greater than or equal to 5 μm is 0, it facilitates further reducing the internal resistance of the battery and improving the kinetics performance of the battery.

In some embodiments, in the section of the positive electrode film layer in the thickness direction of the electrode plate, an area proportion of particles having a particle size greater than or equal to 1 μm and less than 1.5 μm is 15.0% to 25.0%, optionally, 16.0% to 24%, further optionally, 16.0% to 20.0%.

In some embodiments, in the section of the positive electrode film layer in the thickness direction of the electrode plate, the area proportion of the particles having the particle size greater than or equal to 1 μm and less than 1.5 μm is optionally 15%, 16%, 17%, 18%, 19%, 20%, 21%, 22%, 23%, 24%, and 25%, or in a value range between any two of the values.

In the section of the positive electrode film layer in the thickness direction of the electrode plate, the area proportion of the particles having the particle size greater than or equal to 1 μm and less than 1.5 μm can be tested by referring to the above-described manner. A sum of areas of the particles having the particle size greater than or equal to 1 μm and less than 1.5 μm is divided by the total area of the counted particles to be used as the area proportion of the particles having the particle size greater than or equal to 1 μm and less than 1.5 μm in the section of the positive electrode film layer in the thickness direction of the electrode plate.

In the section of the positive electrode film layer in the thickness direction of the electrode plate, the area proportion of the particles having the particle size greater than or equal to 1 μm and less than 1.5 μm is within the above range, which facilitates further improving the compaction density of the electrode plate and improving the energy density of the battery while maintaining the good kinetics performance of the battery.

In some embodiments, in a cumulative distribution curve of a particle areal sphericity obtained from the section of the positive electrode film layer in the thickness direction of the electrode plate, a median $L_{A50}$ of sphericity is 0.60 to 0.85, optionally, 0.65 to 0.80.

In the section of the positive electrode film layer in the thickness direction of the electrode plate, a method for testing the sphericity of the particle is specifically as follows: the particle in the section of the positive electrode film layer is identified with reference to the method described above in the present application, an image in which determination and identification of the particle are completed is imported into ImageJ software for analysis, scale setting is completed according to a scanning electron microscope image, and the particle size of the particle and the area and the sphericity of the particle in the image are analyzed using "Feret diameter", "Area", and "Round" analysis functions. According to a software manual (ImageJ User Guide IJ 1.46r), the "Round" parameter obtained through analysis represents a ratio of a pixel area of the particle to an area of a circle whose fitting length is a diameter, and may be used to represent the sphericity of the particle. When the particle is more spherical, the ratio of the pixel area to the area of the circle whose fitting length is the diameter is closer to 1. Therefore, the sphericity of the particle is represented by the "Round" parameter of the particle obtained through analysis. Particles having a particle size less than 50 nm have a relatively large error in a statistical process, and are difficult to be accurately identified. In addition, a conductive agent usually has a particle size less than 50 nm, which may generally have a relatively large error on a statistical result. Therefore, the particles having the particle size less than 50 nm are not counted in the statistical process of the particle size of the present application, and statistical data of corresponding particles with the Round displayed as "NaN" is deleted. According to the above method, to satisfy the number of samples having statistical significance, not less than 10 scanning electron microscope images whose fields of view do not overlap are collected for each electrode plate. The sphericity of the obtained at least 5000 particles is arranged in ascending order, and a cumulative distribution curve of the sphericity of the particles in the positive electrode film layer is obtained using the sphericity as a horizontal axis and a cumulative area proportion as a vertical axis. $L_{A50}$ is an L value of the sphericity corresponding to a case in which the cumulative area proportion of the vertical axis in a cumulative distribution curve of an L value of the sphericity is 50%.

In some embodiments, in the cumulative distribution curve of the sphericity area obtained from the section of the positive electrode film layer in the thickness direction of the electrode plate, $L_{A50}$ of the sphericity is optionally 0.60, 0.61, 0.62, 0.63, 0.64, 0.65, 0.66, 0.67, 0.68, 0.69, 0.70, 0.705, 0.71, 0.72, 0.73, 0.74, 0.75, 0.76, 0.77, 0.78, 0.79, 0.80, 0.81, 0.82, 0.83, 0.84, and 0.85, or in a value range between any two of the values.

A person skilled in the art may regulate the sphericity of the particle using any known process. As an example, the sphericity of the particle can be adjusted by processes such as shaving, polishing, chemical corrosion, mechanical stirring, extruding, coating, granulating, and adding a surface active agent, and by adjusting parameters of the processes.

Particles with the median $L_{A50}$ of the sphericity within the above range are approximately spherical, which facilitates slippage between the particles under an external force. This can further improve the compaction density of the electrode plate and improve the energy density of the battery.

In some embodiments, in a cumulative distribution curve of a particle roughness area obtained from the section of the positive electrode film layer in the thickness direction of the electrode plate, a median $R_{A50}$ of roughness is 0.92 to 0.96.

In the section of the positive electrode film layer in the thickness direction of the electrode plate, a method for testing the roughness of the particle is specifically as follows: the particle in the section of the positive electrode film layer is identified with reference to the method described above in the present application, an image in which determination and identification of the particle are completed is imported into ImageJ software for analysis, scale setting is completed according to an scanning electron microscope image, and the particle size of the particle and the area and the roughness of the particle in the image are analyzed using "Feret diameter", "Area", and "Solidity" analysis functions. According to a software manual (ImageJ User Guide IJ 1.46r), the "Solidity" parameter obtained through analysis represents a ratio of a pixel area of the particle to a convex area. Therefore, the roughness of the particle is represented by the "Solidity" parameter of the particle obtained through analysis. It can be known according to the definition that the more the roughness is closer to 1, the smoother the particle is. Particles having a particle size less than 50 nm have a relatively large error in a statistical process, and are difficult to be accurately identified. In addition, a conductive agent usually has a particle size less than 50 nm, which may generally have a relatively large error on a statistical result. Therefore, the particles having the particle size less than 50 nm are not counted in the statistical process of the particle size of the present application, and statistical data of corresponding particles with the Solidity displayed as "NaN" is deleted. According to the above method, to satisfy the number of samples having statistical significance, not less than 10 scanning electron microscope images whose fields of view do not overlap are collected for each electrode plate. The roughness of the obtained at least 5000 particles is arranged in ascending order, and a cumulative distribution curve of the roughness of the particle in the positive electrode film layer is obtained using the roughness as a horizontal axis and a cumulative area proportion as a vertical axis. $R_{A50}$ is an R value of the roughness corresponding to a case in which the cumulative area proportion of the vertical axis in the cumulative distribution curve of the R value of the roughness is 50%.

In some embodiments, in the cumulative distribution curve of the particle roughness area obtained from the section of the positive electrode film layer in the thickness direction of the electrode plate, a median $R_{A50}$ of roughness is optionally 0.92, 0.93, 0.94, 0.95, and 0.96, or in a value range between any two of the values.

A person skilled in the art may regulate the roughness of the particles using any known process. As an example, the roughness of the particle can be adjusted by processes such as grinding, polishing, milling, micro-machining, electroplating, and lapping, and by adjusting parameters of the processes.

Particles with the median $R_{A50}$ of the roughness within the above range have a relatively smooth surface, so that a friction force between the particles is relatively small, and slippage easily occurs under an external force, which can further improve the compaction density of the electrode plate, and improve the energy density of the battery.

In some embodiments, an iron dissolution rate of the positive electrode film layer is 500 ppm to 2000 ppm, optionally, 500 ppm to 1500 ppm.

The iron dissolution rate of the positive electrode film layer may be tested in the following manner. Specifically, after the electrode plate is disassembled from the battery and cleaned, the electrode plate is filled into small disks having a diameter of 14 mm; multiple small disk samples are taken so that a total mass of the samples is approximately 5 g, and the small disk samples are added into 100.3 g of an ascorbic acid solution having a mass concentration of 0.3% (a solvent is ultra pure water); after stirring is performed for 5 minutes at a speed of 500 revolutions per minute, the solution is quickly drawn up using a 5 ml syringe, and the solution is filtered into a test tube using a syringe filter having a particle size of 0.45 μm; 1 ml of supernate is drawn up using a pipet, and added to a glass volumetric flask and diluted at a factor of 50, and the diluted solution is tested using an ICP-OES to obtain the concentration of an iron element in the solution; and the iron dissolution rate of the positive electrode film layer is calculated using a formula: [(concentration of the iron element tested by ICP×volume of the solution/mass of the solution taken for constant volume operation)×100.3 g/(mass of the small disk of the electrode plate-mass of a current collector of the small disk)], where the volume of the solution is 50 ml, and the mass of the solution taken for constant volume operation is 1 g. Preferably, the mass pf the current collector of the small disk is obtained by multiplying the thickness of the small disk by the area and then by the density. The thickness of the small disk may be equivalent to measuring the thickness of the current collector in an uncoated region using a thickness measurement meter. It may be understood that although the current collector may extend in a compaction process of a coated region, resulting in a slight decrease in the thickness compared with that in the uncoated region, the decrease amplitude is negligible, thereby not greatly affecting a test result. More preferably, when the current collector is an aluminum foil, the density is 2.7 $g/cm^3$.

In some embodiments, the iron dissolution rate of the positive electrode film layer is optionally 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, and 2000 ppm, or in a value range between any two of the values.

A person skilled in the art may regulate the iron dissolution rate of the positive electrode film layer using any known process. As an example, the iron dissolution rate of the positive electrode film layer is regulated by regulating a surface coating mass of the positive electrode film layer, and regulating a temperature, time, and a pressure in a preparing process.

The iron dissolution rate can indirectly reflect completeness and compactness of the carbon coating on the surface of the positive electrode active material. A lower iron dissolution rate means that iron ions obtained after acid dissolving are not likely to separate out from the carbon coating layer, that is, the carbon coating layer on the surface of the positive electrode active material is more complete and compact. The positive electrode active material having the iron dissolution rate within the above range has a relatively complete and compact carbon coating layer, which can improve electric contact between positive electrode active materials, thereby improving the electric conductivity of the positive electrode active material, reducing polarization of the positive electrode active material, and further optimizing the kinetics performance of the lithium-ion secondary battery. In addition, the space occupancy of the compact coating carbon layer is low, and in the rolling process, particle gaps are easily compressed by stress, which can improve both the compaction density of the electrode plate and the energy density of the battery.

In some embodiments, a mass content of a carbon element is 0.8% to 1.8%, optionally, 0.90% to 1.5% based on a total mass of the positive electrode active material.

The mass content of the carbon element, based on the total mass of the positive electrode active material, may be measured using methods and devices that are known in the art. For example, with reference to GB/T 21023-2006 "Determination of Total Carbon and Sulfur Content in Iron and Steel-Infrared Absorption Method After Combustion in a High-Frequency Induction Furnace", the measurement is performed using a Dekai HCS Infrared Carbon/Sulfur Analyzer.

In some embodiments, the mass content of the carbon element is optionally 0.8%, 0.9%, 1.0%, 1.1%, 1.2%, 1.3%, 1.4%, 1.5%, 1.6%, 1.7%, and 1.8%, or in a value range between any two of the values based on the total mass of the positive electrode active material.

Compared with a positive electrode active material of lithium-containing transition metal phosphate in the prior art, the positive electrode active material has a relatively low carbon coating content, which can further improve the loading capacity of the lithium-containing transition metal phosphate in the positive electrode plate, thereby improving the energy density of the lithium-ion secondary battery.

In some embodiments, a lithium-iron antisite defect concentration of the positive electrode active material is 0.1% to 1.5%.

XRD data of a sample is collected using an XRD, material phase analysis is performed on the sample, and a CIF file of the material phase obtained using an open source website is used as an initial model of a crystal structure, including defining a unit cell parameter, an atomic position, a site occupation probability, and the like. In the initial model of the crystal structure, considering the possibility of Fe—Li antisite, a possible content of Li at a Fe position and a possible content of Fe at a Li position are set, and an initial value is set to 0.1%. FullProf Suite software is used to perform fitting refinement on the collected XRD data, and parameter refinement is performed according to a refinement sequence of a background parameter, a band intensity, the unit cell parameter, and a band shape. When the fitted band shape and the experimental band shape are best equipped, and Rwp is less than 10, a refined site occupation probability of Li and Fe is obtained, and used as the lithium-iron antisite defect concentration.

In some embodiments, the lithium-iron antisite defect concentration of the positive electrode active material is optionally 0.1%, 0.2%, 0.3%, 0.4%, 0.5%, 0.6%, 0.7%, 0.8%, 0.9%, 1.0%, 1.1%, 1.2%, 1.3%, 1.4%, and 1.5%, or in a value range between any two of the values.

A person skilled in the art may regulate the lithium-iron antisite defect of the positive electrode active material using any known process. As an example, the lithium-iron antisite defect of the positive electrode active material can be regulated by regulating a sintering temperature, a sintering period, a preparation method, a raw material stoichiometric ratio, and the like.

In a preparing and cycling process, unavoidably, some lithium vacancies exist in a crystal structure of the positive electrode active material. The lithium vacancy not only causes ferrous ions to be oxidized to ferric ions, but also induce iron ions to partially migrate to a lithium site, forming the lithium-iron antisite defect, blocking a one-dimensional diffusion channel for lithium ions, and negatively affecting solid-phase transmission of the lithium ions. The positive electrode active material in this embodiment of the present application has a low lithium-iron antisite defect, which facilitates uniform transmission of the lithium ions in a solid phase, thereby further improving the kinetics performance of the lithium-ion secondary battery.

In some embodiments, the lithium-iron antisite defect concentration of the positive electrode active material is 0.3% to 1.0%.

In some embodiments, the lithium-containing transition metal phosphate includes a component having the following general formula:

$$Li_mF_xP_yO_jQ_q,$$

where Q includes one or more of Al, Na, K, Mg, Cu, Mn, Cr, Zn, Pb, Ca, Co, Ni, Sr, Nb, V, Ti, B, S, Si, N, F, Cl, and Br, $0.8 \le m \le 1.15$, $0.9 \le x \le 1$, $0.95 \le y \le 1$, $3.5 \le j \le 4$, and $0 < q \le 0.1$.

In some embodiments, m is optionally 0.8, 0.85, 0.9, 0.95, 0.98, 1.00, 1.03, 1.05, 1.08, 1.10, 1.13, and 1.15, or in a value range between any two of the values; x is optionally 0.9, 0.91, 0.92, 0.93, 0.94, 0.95, 0.96, 0.97, 0.98, 0.99, and 1.0, or in a value range between any two of the values; y is optionally 0.95, 0.96, 0.97, 0.98, 0.99, and 1.00, or in a value range between any two of the values; j is optionally 3.5, 3.6, 3.7, 3.8, 3.9, and 4, or in a value range between any two of the values; q is optionally 0, 0.01, 0.02, 0.03, 0.04, 0.05, 0.06, 0.07, 0.08, 0.09, and 0.1, or in a value range between any two of the values.

Selecting a proper modifying element Q can improve an ion diffusion path of the positive electrode active material, improve a lithium ion diffusion rate of the positive electrode active material, and improve the kinetics performance of the battery.

In some embodiments, the positive electrode active material includes one or more of lithium iron phosphate, a doping modification material thereof, and a coating modification material thereof.

In some embodiments, the positive electrode active material includes a titanium element, and a mass content of the titanium element is 2000 ppm to 6000 ppm based on the total mass of the positive electrode active material.

Types and contents of elements in the positive electrode active material may be tested in any well-known manner in the art. As an example, with reference to Appendix C of GB/T 33822-2017, a test for the titanium element and the content thereof is performed by inductively coupled plasma-optical emission spectrometry.

In some embodiments, the mass content of the titanium element is optionally 2000 ppm, 2500 ppm, 3000 ppm, 3500 ppm, 4000 ppm, 4500 ppm, 5000 ppm, 5500 ppm, and 6000 ppm, or in a value range between any two of the values based on the total mass of the positive electrode active material.

Doping of the titanium element in the positive electrode active material is beneficial to causing lattice distortion, thereby reducing Li—O bond energy, improving a lithium ion transmission rate, and improving the kinetics performance of the lithium-ion secondary battery. However, in the prior art, a doping content of the titanium element in the lithium-containing transition metal phosphate usually cannot exceed 3000 ppm, because it is difficult for too much titanium element to completely enter a body phase of the lithium-containing transition metal phosphate, and it is easy to become a harmful impurity phase remaining on the surface, which negatively affects the battery performance.

The positive electrode active material in this embodiment of the present application has a high content of the titanium element, and surprisingly, a high addition amount of the titanium element does not form a harmful impurity phase that have negative effects on the energy density and the kinetics performance of the battery. Although the reason is unclear, it is presumed that the titanium element and a phosphate radical and other elements (for example, a lithium element) may together form a fast ion conductor, which in turn improves the kinetics performance of the battery.

In some embodiments, a powder compaction density of the positive electrode active material under a pressure of 3 T is 2.50 g/cm$^3$ to 2.70 g/cm$^3$.

In the present application, the term "powder compaction density" refers to the density (unit of g/cm$^3$) of a powder compact formed during external force compression. This process involves the movement and deformation of powder, where larger voids are filled, a contact area between the particles increases, so that an attraction force is generated between atoms and the mechanical fitting action between the particles is enhanced. In this way, the compact has a certain density and strength.

The powder compaction density of the positive electrode active material may be measured using methods and devices known in the art. For example, reference may be made to GB/T 24533-2009 for measurement using a compaction density instrument. Specifically, a certain amount of the positive electrode active material is placed on a special compaction mold (the diameter of the mold is known), and the mold is hollow in the middle with a metal disc at the top and the bottom. The positive electrode active material is placed between the metal disks, a metal cylinder is placed at the top, and the mold is placed on the compaction density instrument. A bottom area of the mold is 1.327 $cm^2$. The pressure is set to 3 T, and the thickness of the positive electrode active material under the pressure of 3 T can be read on the device. The powder compaction density of the positive electrode active material is ρ=m/v, where v=(S×H), m is the mass of the positive electrode active material, S is the bottom area of the mold, and His the thickness of the compacted positive electrode active material.

In some embodiments, the powder compaction density of the positive electrode active material under the pressure of 3 T is optionally 2.50 g/$cm^3$, 2.51 g/$cm^3$, 2.52 g/$cm^3$, 2.53 g/$cm^3$, 2.54 g/$cm^3$, 2.55 g/$cm^3$, 2.56 g/$cm^3$, 2.57 g/$cm^3$, 2.58 g/$cm^3$, 2.59 g/$cm^3$, 2.60 g/$cm^3$, 2.61 g/$cm^3$, 2.62 g/$cm^3$, 2.63 g/$cm^3$, 2.64 g/$cm^3$, 2.65 g/$cm^3$, 2.66 g/$cm^3$, 2.67 g/$cm^3$, 2.68 g/$cm^3$, 2.69 g/$cm^3$, and 2.70 g/$cm^3$, or in a value range between any two of the values.

Although the area proportion of the particles having the particle size greater than or equal to 1.5 μm of the positive electrode active material is low, the positive electrode active material can still achieve a high compaction density under the external force by the high graphitization degree, thereby providing a material basis for improving the compaction density of the electrode plate and preparing a lithium-ion secondary battery with a high energy density.

In some embodiments, the powder compaction density of the positive electrode active material under the pressure of 3 T is 2.52 g/$cm^3$ to 2.68 g/$cm^3$.

In some embodiments, a powder tap density of the positive electrode active material is 0.70 g/$cm^3$ to 1.50 g/$cm^3$, optionally, 0.70 g/$cm^3$ to 1.20 g/$cm^3$.

The powder tap density may be tested in any known manner in the art.

As an example, an electronic balance is turned on, and the electronic balance is zeroed out after an Erlenmeyer flask is used as a base and placed on the electronic balance. A graduated cylinder for the tap density is placed on the Erlenmeyer flask for weighing, and the weight of the graduated cylinder is recorded. A sample bag is opened, the sample in the sample bag is first mixed uniformly by stirring with a clean sample scoop for 3 to 5 circles, and then the sample is smoothly transferred to the graduated cylinder. Power contamination on the connected surface is wiped off by dust-free paper, and then the graduated cylinder is placed into the zeroed-out Erlenmeyer flask for weighing. An opening of the graduated cylinder is sealed using a sealing film, and the graduated cylinder for the tap density is placed into a matched instrument rubber ring to ensure that the graduated cylinder for the tap density is tightly adhered to the rubber ring and kept perpendicular to the instrument surface. For an instrument, a vibration frequency is set to 250 times/min, the number of times of vibration is set to 5000, and a key is pressed to vibrate for 20 min; then, a tap density (TD) tube is removed, the surface of the graduated cylinder is irradiated using a flashlight, and a highest scale $V_1$ and a lowest scale $V_2$ are read by a visual observation method, and an average value V of the two scales is used; and a mass $m_0$ of the graduated cylinder is subtracted from a mass mi of the graduated cylinder and the sample to obtain a powder mass m, and a sample tap density is obtained using a density formula ρ=m/v.

In some embodiments, the powder tap density of the positive electrode active material is optionally 0.70 g/$cm^3$, 0.75 g/$cm^3$, 0.80 g/$cm^3$, 0.85 g/$cm^3$, 0.90 g/$cm^3$, 0.95 g/$cm^3$, 1.00 g/$cm^3$, 1.05 g/$cm^3$, 1.10 g/$cm^3$, 1.15 g/$cm^3$, 1.20 g/$cm^3$, 1.25 g/$cm^3$, 1.30 g/$cm^3$, 1.35 g/$cm^3$, 1.40 g/$cm^3$, 1.45 g/$cm^3$, and 1.50 g/$cm^3$, or in a value range between any two of the values.

An effective graduation autonomously formed by the positive electrode active material in this embodiment of the present application is limited, so the tap density is relatively low. However, with a high graphitization degree of the positive electrode film layer, easy slippage can be achieved under the external force to improve the compaction density.

In some embodiments, a powder resistivity of the positive electrode active material under a pressure intensity of 8 MPa is 0.5 Ω·cm to 30.0 Ω·cm.

The powder resistivity of the positive electrode active material may be measured using methods and devices known in the art. For example, reference may be made to GB/T 33822-2017, and a powder resistivity meter (Suzhou Lattice, ST2722 type) is used for measurement. Specifically, a particular amount of the positive electrode active material (for example, 1 g) is weighed and added to a feeding cavity of the powder resistivity meter. A pressure intensity of 8 MPa is applied. A forward resistivity and a reverse resistivity of the positive electrode active material are separately tested, and an average value of the forward resistivity and the reverse resistivity is used as the powder resistivity of the positive electrode active material.

In some embodiments, the powder resistivity of the positive electrode active material under the pressure intensity of 8 MPa is optionally 0.5 Ω·cm, 1 Ω·cm, 2 Ω·cm, 3 Ω·cm, 4 Ω·cm, 5 Ω·cm, 6 Ω·cm, 7 Ω·cm, 8 Ω·cm, 9 Ω·cm, 10 Ω·cm, 15 Ω·cm, 20 Ω·cm, 25 Ω·cm, and 30 Ω·cm, or in a value range between any two of the values.

The positive electrode active material has the high graphitization degree. Therefore, with a $sp^2$ structure of the surface carbon, fast conduction of electrons between the particles can be easily achieved, so that the positive electrode active material has a low powder resistivity, which facilitates increasing a solid-phase transmission rate of the electrons, thereby further improving the kinetics performance of the battery.

In some embodiments, the powder resistivity of the positive electrode active material under the pressure intensity of 8 MPa is 2.0 Ω·cm to 20.0 Ω·cm.

In some embodiments, a gravimetric discharge capacity of the positive electrode active material at room temperature at a discharge rate of 1C is 135 mAh/g to 150 mAh/g.

In the present application, the positive electrode active material is assembled into a button battery, and the electric performance is tested on a LAND battery tester. After charge to 3.75 V in a voltage range of 2.0 V to 3.75 V at 25±5° C. at a constant current of 1C, operation is suspended for 5 minutes, charge to a cut-off current of 50 μA at a constant current is performed, and then discharge to 2.0 V at a constant current of 1C is performed. The discharge capacity of the button battery is divided by the mass of the positive electrode active material to be used as the gravimetric discharge capacity of the positive electrode active material at room temperature at the discharge rate of 1C.

A procedure for preparing and testing the button battery is as follows: 2.0 g of the positive electrode active material, conductive carbon black, and polyvinylidene fluoride (PVDF) are mixed according to a mass ratio of 0.9:0.05: 0.05, then an organic solvent N-methypyrrolidone (NMP) is added, and after sufficient and uniform mixing, a 150 μm scraper is used for coating, oven drying at 100° C. is performed for 2 h, and the positive electrode plate is compacted according to the compaction density of 2.0 g/cm$^3$ to 2.2 g/cm$^3$, punched into disks with a diameter of 14 mm using a puncher, and then the disk of the positive electrode plate is weighed, and the weight is recorded. The weighed positive electrode plate is placed in a vacuum drying oven (105° C., 1-12 h, −90 kpa). The oven-dried positive electrode plate is placed in a glove box, and a battery is assembled according to a sequence of a negative electrode housing-nickel mesh-lithium plate-separator-positive electrode plate-positive electrode housing. 65-87 μL of an electrolyte solution (the electrolyte solution is a mixed solvent of ethylene carbonate (EC) and 1,2-dimemylarbonate (DMC) at a volume ratio of 1:1, and an electrolyte is $LiPF_6$) is added drop-wise (using a pipette). With a negative electrode on the top, the button battery is placed in a groove of a sealing machine. A sealing pressure is 650 kg/cm$^2$. The button battery is taken down using insulated forceps and is placed into a dust-free bag, the glove box is removed, and the dust-free bag is placed in a thermostatic room for 3 h, to obtain the button battery used for testing.

It may be understood that, the gravimetric discharge capacity of the positive electrode active material may also be obtained in a manner that after the battery is disassembled, the positive electrode plate is obtained, and the button battery is formed by assembling according to the above-described method.

In some embodiments, the gravimetric discharge capacity of the positive electrode active material at room temperature at the discharge rate of 1C is optionally 135 mAh/g, 136 mAh/g, 137 mAh/g, 138 mAh/g, 139 mAh/g, 140 mAh/g, 141 mAh/g, 142 mAh/g, 143 mAh/g, 144 mAh/g, 145 mAh/g, 146 mAh/g, 147 mAh/g, 148 mAh/g, 149 mAh/g, and 150 mAh/g, or in a value range between any two of the values.

The positive electrode active material has a high gravimetric discharge capacity at the rate of 1C, indicating that the positive electrode active material has good charge and discharge capabilities, which facilitates improving the kinetics performance of the battery.

In some embodiments, a discharge capacity ratio η of the positive electrode active material discharged to 3.2 V is greater than or equal to 85%. η is defined as: at room temperature, the button battery including the positive electrode active material is charged and discharged twice at a constant current with a rate of 0.1C in a voltage range of 2.0 V to 3.75 V, and then is charged and discharged once at a constant current with a rate of 1C, and in a charge and discharge test at the rate of 1C, a capacity value of a discharge voltage of 3.2 Vis extracted and denoted as $C_1$, a capacity value of a discharge voltage to 2.0 V is extracted and denoted as $C_2$, and $n=C_1/C_2$, where a charge process includes constant-voltage charge, with a constant voltage of 3.75 V, and a constant voltage cut-off current of 50 μA.

The η value of the positive electrode active material may be measured using methods and devices known in the art. As an example, the button battery is first prepared with reference to the above-described method, and the electric performance of the prepared button battery is tested on a LAND battery tester. Specifically, the button battery is charged and discharged twice at a constant current with a rate of 0.1C in a voltage range of 2.0 V to 3.75 V, charged at a constant current to a cut-off voltage, and then charged at a constant voltage to a current of 50 μA, and then charged and discharged once at a constant current with a rate of 1C. In a charge and discharge test at a rate of 1C, a capacity value of discharge from 3.75 V to a voltage of 3.2 Vis denoted as $C_1$, a capacity value of discharge from 3.75 V to 2.0 V is denoted as $C_2$, and $\eta=C_1/C_2$.

In some embodiments, n is optionally 85%, 86%, 87%, 88%, 88.1%, 89%, 90%, 90.1%, 91%, 92%, 92.2%, 93%, 94%, 94.1%, 94.5%, 95%, and 95.1%, or in a value range between any two of the values.

In some embodiments, the discharge capacity ratio η of the positive electrode active material, discharged to 3.2 V, in the freshly prepared lithium-ion secondary battery is greater than or equal to 88%. After the freshly prepared lithium-ion secondary battery is charged and discharged in a voltage range of 2.0 V to 3.75 V at a constant current with a rate of 0.1C for a period of time, the discharge capacity ratio η of the positive electrode active material discharged to 3.2 V may remain being greater than or equal to 85%.

A high discharge capacity ratio of the positive electrode active material, discharged to 3.2 V, used in the lithium-ion secondary battery in this embodiment of the present application means that the positive electrode active material has a good kinetics performance. In addition, a high value of n indicates that the lithium-ion secondary battery including the positive electrode active material still has a high voltage when discharged to a low state of charge (SOC), which facilitates maintaining a good power performance.

In some embodiments, in a 0.1C discharge curve of the button battery including the positive electrode active material, a discharge plateau exists in a voltage range of 2.5 V to 2.9 V.

The discharge plateau generally refers to a region in which a voltage is relatively stable and unchanged in a charge and discharge process of the battery. In the discharge process of a battery, a current flows out of the battery, and a voltage of the battery decreases to some extent at the beginning, but subsequently enters a relatively stable region. A change of the voltage in this region is very small, and the stable voltage region is referred to as the discharge plateau.

The button battery may be formed by disassembling the positive electrode plate in the lithium-ion secondary battery, and combining the positive electrode plate with lithium metal. The button battery may also be assembled and prepared by referring to the above-described method. In the present application, the positive electrode active material is assembled into a button battery, and the electric performance is tested on a LAND battery tester. After charge to 3.75 V in a voltage range of 2.0 V to 3.75 V at a constant current of 0.1C, operation is suspended for 5 minutes, charge to a cut-off current of 50 μA at a constant current is performed, and then discharge to 2.0 V at a constant current of 0.1C is performed.

A discharge curve shows that the standard charge and discharge plateau voltage of the lithium-containing transition metal phosphate is usually between 3.2 V and 3.65 V. The button battery including the positive electrode active material in this embodiment of the present application displays a new charge and discharge plateau in a voltage range of 2.5 V to 2.9 V, which facilitates increasing a discharge interval of the battery, thereby improving the energy density of the battery. In addition, this also verifies the guess that the positive electrode active material in this embodiment of the present application includes a fast ion conductor.

In some embodiments, a mass content of a conductive agent is 0 to 1.5% based on a total mass of the positive electrode film layer.

In some embodiments, the mass content of the conductive agent is optionally 0, 0.1%, 0.2%, 0.3%, 0.4%, 0.5%, 0.6%, 0.7%, 0.8%, 0.9%, 1%, 1.1%, 1.2%, 1.3%, 1.4%, and 1.5%, or in a value range between any two of the values based on the total mass of the positive electrode film layer.

In some embodiments, the conductive agent includes at least one of superconducting carbon, acetylene black, carbon black, Ketjen black, carbon dots, carbon nanotubes, graphene, and carbon nanofibers.

The carbon layer of the positive electrode active material has a high graphitization degree, so that the positive electrode active material has good electronic conductivity, and use of the conductive agent in the positive electrode film layer can be reduced or even eliminated, thereby facilitating further increasing the loading capacity of the positive electrode active material and improving the energy density of the lithium-ion secondary battery.

In some embodiments, the mass content of the conductive agent is 0 based on the total mass of the positive electrode film layer.

The positive electrode active material has extremely high electronic conductivity, so that no conductive agent may even be added to the positive electrode film layer, which is beneficial to further increasing the loading capacity of the positive electrode active material and improving the energy density of the lithium-ion secondary battery.

In some embodiments, the positive electrode film layer further includes a binder, and a mass content of the positive electrode active material is 95.5% to 99.5%, optionally, 96.5%-99.5%; and a mass content of the binder is 0.5% to 3% based on the total mass of the positive electrode film layer.

In some embodiments, the binder includes at least one of PVDF, polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin.

In some embodiments, the mass content of the positive electrode active material is optionally 95.5%, 96%, 96.5%, 97%, 98%, 99%, and 99.5%, or in a value range between any two of the values based on the total mass of the positive electrode film layer.

In some embodiments, the mass content of the binder is optionally 0.5%, 1%, 1.5%, 2%, 2.5%, and 3%, or in a value range between any two of the values based on the total mass of the positive electrode film layer.

In some embodiments, a single-side areal density of the positive electrode film layer is 300 mg/1540 $mm^2$ to 450 mg/1540 $mm^2$.

In the present application, the single-side areal density of the positive electrode film layer has a meaning well-known in the art, and can be measured using methods known in the art. For example, a single-side coated and compacted positive electrode plate (if a double-side coated positive electrode plate is used, the positive electrode film layer on one side may be first wiped off) is taken, and punched into small disks with an area of $S_1$, and the small disk of the positive electrode plate is weighed, with the weight recorded as $M_1$. Then, the positive electrode film layer of the above weighed positive electrode plate is wiped off, and the current collector is weighted, with the weight recorded as $M_0$. The single-side areal density of the positive electrode film layer=$(M_1-M_0)/S_1$. To ensure accuracy of the test result, multiple groups (for example, 10 groups) of samples to be tested may be tested, and an average value is calculated as the test result.

In some embodiments, the single-side areal density of the positive electrode film layer is optionally 300 mg/1540 $mm^2$, 310 mg/1540 $mm^2$, 320 mg/1540 $mm^2$, 330 mg/1540 $mm^2$, 340 mg/1540 $mm^2$, 350 mg/1540 $mm^2$, 360 mg/1540 $mm^2$, 370 mg/1540 $mm^2$, 380 mg/1540 $mm^2$, 390 mg/1540 $mm^2$, 400 mg/1540 $mm^2$, 410 mg/1540 $mm^2$, 420 mg/1540 $mm^2$, 430 mg/1540 $mm^2$, 440 mg/1540 $mm^2$, and 450 mg/1540 $mm^2$, or in a value range between any two of the values.

The positive electrode film layer having the areal density within the above range can facilitate improving the energy density of the lithium-ion secondary battery.

In some embodiments, when the lithium-ion secondary battery is in a fully discharged state, the compaction density of the positive electrode film layer is 2.51 g/$cm^3$ to 2.73 g/$cm^3$.

In some embodiments, when the lithium-ion secondary battery is in the fully discharged state, the compaction density of the positive electrode film layer is 2.55 g/$cm^3$ to 2.70 g/$cm^3$.

In the present application, the fully discharged state refers to a state in which the battery is placed in a drying oven environment of 25° C., left to stand for 2 h, and after a temperature of the battery is maintained at 25° C., the battery is discharged to 2.5 V at a constant current of 1/3C and then discharged 2.0 V at a constant current of 0.1C.

The compaction density of the positive electrode film layer may be tested using methods known in the art. As an example, the battery is placed in a drying oven environment of 25° C., left to stand for 2 h. After the temperature of the battery is maintained at 25° C., the battery is discharged to 2.5 V at a constant current of 1/3C, and then discharged to 2.0 V at a constant current of 0.1C. The battery is disassembled to obtain the positive electrode plate. A residual electrolyte solution is processed using a solvent of DMC. The electrode plate is oven-dried, and cut into small disks with an area of S, to obtain a mass $W_1$ thereof. A thickness $T_1$ of the positive electrode plate is measured using a tenth micrometer. Then, the positive electrode film layer of the above weighed electrode plate is wiped off, and the current collector is weighted, with a mass recorded as $W_2$. A thickness $T_2$ of the current collector is measured using a tenth micrometer, and then the compaction density of the positive electrode film layer is $PD=(W_1-W_2)/[(T_1-T_2)\times S]$.

In some embodiments, when the lithium-ion secondary battery is in the fully discharged state, the compaction density of the positive electrode film layer is optionally 2.51 g/$cm^3$, 2.52 g/$cm^3$, 2.53 g/$cm^3$, 2.54 g/$cm^3$, 2.55/$cm^3$, 2.56 g/$cm^3$, 2.57 g/$cm^3$, 2.58 g/$cm^3$, 2.59 g/$cm^3$, 2.60 g/$cm^3$, 2.61 g/$cm^3$, 2.62 g/$cm^3$, 2.63 g/$cm^3$, 2.64 g/$cm^3$, 2.65 g/$cm^3$, 2.66 g/$cm^3$, 2.67 g/$cm^3$, 2.68 g/$cm^3$, 2.69 g/$cm^3$, 2.70 g/$cm^3$, 2.71 g/$cm^3$, 2.72 g/$cm^3$, and 2.73 g/$cm^3$, or in a value range between any two of the values.

In some embodiments, after processing of a compaction process, the compaction density of the positive electrode film layer is 2.63 g/$cm^3$ to 2.85 g/$cm^3$.

In some embodiments, after processing of the compaction process, the compaction density of the positive electrode film layer is optionally 2.63 g/cm$^3$, 2.64 g/cm$^3$, 2.65 g/cm$^3$, 2.66 g/cm$^3$, 2.67 g/cm$^3$, 2.68 g/cm$^3$, 2.69 g/cm$^3$, 2.70 g/cm$^3$, 2.71 g/cm$^3$, 2.72 g/cm$^3$, 2.73 g/cm$^3$, 2.74 g/cm$^3$, 2.75 g/cm$^3$, 2.76 g/cm$^3$, 2.77 g/cm$^3$, 2.78 g/cm$^3$ g/cm$^3$, 2.79 g/cm$^3$, 2.80 g/cm$^3$, 2.81 g/cm$^3$, 2.82 g/cm$^3$, 2.83 g/cm$^3$, 2.84 g/cm$^3$, and 2.85 g/cm$^3$, or in a value range between any two of the values.

In the present application, the term "compaction" means that in an assembly process of the battery, the positive electrode film layer is compacted by a mechanical pressure, so as to improve the compaction and the electric conductivity thereof.

In some embodiments, after processing of a formation process, the compaction density of the positive electrode film layer is 2.53 g/cm$^3$ to 2.73 g/cm$^3$.

In some embodiments, after processing of the formation process, the compaction density of the positive electrode film layer is optionally 2.53 g/cm$^3$, 2.54 g/cm$^3$, 2.55 g/cm$^3$, 2.56 g/cm$^3$, 2.57 g/cm$^3$, 2.58 g/cm$^3$, 2.59 g/cm$^3$, 2.60 g/cm$^3$, 2.61 g/cm$^3$, 2.62 g/cm$^3$, 2.63 g/cm$^3$, 2.64 g/cm$^3$, 2.65 g/cm$^3$, 2.66 g/cm$^3$, 2.67 g/cm$^3$, 2.68 g/cm$^3$, 2.69 g/cm$^3$, 2.70 g/cm$^3$, 2.71 g/cm$^3$, 2.72 g/cm$^3$, and 2.73 g/cm$^3$, or in a value range between any two of the values.

In the present application, formation refers to that in a first charge and discharge process of the battery, a stable solid electrolyte interface (SEI film) and an electrode structure are formed by an electrochemical reaction.

It may be understood that, accompanied with rebound of the electrode plate in the cycling process, the compaction density of the positive electrode film layer in the fully discharged state of the lithium-ion secondary battery is slightly lower than the compaction density of the positive electrode film layer after compaction and formation.

The compaction density of the positive electrode film layer is within the above range, which facilitates improving the energy density of the lithium-ion secondary battery.

In some embodiments, the compaction density of the positive electrode film layer is 2.51 g/cm$^3$ to 2.73 g/cm$^3$, and in the section of the positive electrode film layer in the thickness direction of the electrode plate, a porosity of the positive electrode film layer is 10% to 22%.

In some embodiments, the compaction density of the positive electrode film layer is 2.55 g/cm$^3$ to 2.70 g/cm$^3$, and in the section of the positive electrode film layer in the thickness direction of the electrode plate, the porosity of the positive electrode film layer is 10% to 20%.

In some embodiments, in the section of the positive electrode film layer in the thickness direction of the electrode plate, the porosity of the positive electrode film layer is optionally 10%, 11%, 12%, 13%, 14%, 15%, 16%, 17%, 18%, 19%, 20%, 21%, and 22%, or in a value range between any two of the values.

In the section of the positive electrode film layer in the thickness direction of the electrode plate, the porosity of the positive electrode film layer may be tested in the following manner. A scanning electron microscope image of the section of the positive electrode film layer in the thickness direction of the electrode plate, which is obtained in the above-described manner, is imported into ImageJ software, a straight line tool is selected, a scale length in the image is marked using a straight line, "Analyze Set Scale" is clicked, and a scale parameter is set in the software according to the scale length in the image. A rectangle tool is selected, a part of the image outside a scale region is selected, a selected region is duplicated using "Image Duplicate", and an image format is adjusted using "Image Type 8 bit"; "Analyze Set Measurements" is selected, and the following five options "Area", "Mean gray value", "Area Fraction", "Limit to threshold", and "Feret's diameter" are selected, where "Decimal places" is selected as 3, "Image"—"Adjust"—"Threshold" are sequentially selected, and 0 and 100 are sequentially set at the "Threshold" input field, so that pore data in the electron microscope image of the section can be exported using an Analyze-Measure function. Exporting is performed using "Image"—"Overlay"—"Flatten", to obtain a pore image. "Apply" in "Threshold" is clicked, then "Analyze"—"Analyze Particles" are clicked, and the left four columns are checked, to obtain the statistical data of pores.

It may be understood that in this embodiment of the present application, the "pore" in the section of the positive electrode film layer is identified using an image color difference and a threshold. The "pore" is not pore data obtained in a venting test, and is mainly used for representing a cross-sectional area between the particles in the section of the positive electrode film layer. This method is better than the venting method, because the porosity obtained through the venting method is related to the pore between the particles, and is also related to the hole in the carbon layer coating the surface of the lithium iron phosphate particles. Consequently, the pore between the particles cannot be objectively reflected.

Figure 8:
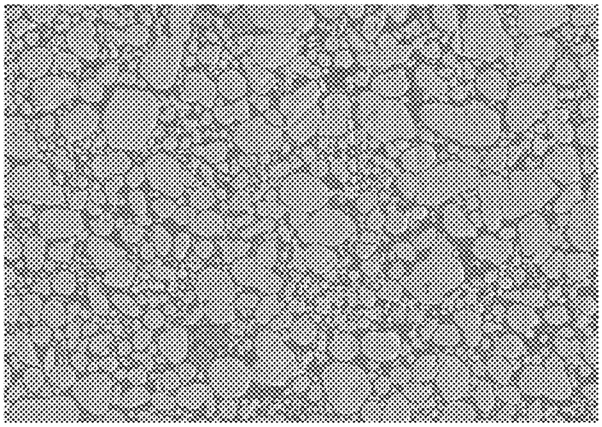
FIG. 8 is a test diagram of a porosity of the section of the positive electrode film layer in the thickness direction of the electrode plate according to an embodiment of the present application.

As shown in FIG. 8, a lower porosity, tested in this method, in the section of the positive electrode film layer indicates, on one hand, better graduation of large, middle, and small particles in the positive electrode film layer, so that the compaction density is high. On the other hand, after the same graduation and rolling pressure, if the porosity is low, it indicates easy slippage between the particles, thereby reducing the risks of overpressure and stress concentration of the film layer, further reducing a demolding probability of a positive electrode diaphragm in a long cycle process, and facilitating improving a long-cycle performance of the battery.

In some embodiments, the positive electrode plate includes a base coating layer, and the base coating layer is arranged between the positive electrode film layer and the current collector; and the base coating layer includes carbon-based particles, and a distribution density of the carbon-based particles having a particle size greater than 100 nm in the base coating layer is less than or equal to 10 pcs/10 μm.

The carbon-based particle refers to a particle using a carbon element as a main component, and includes, but is not limited to, conductive carbon and carbon black.

The base coating layer facilitates improving the conductivity and an adhesion force between the positive electrode film layer and the current collector, which reduces demolding of the positive electrode film layer from the current collector in the cycle process, thereby improving the kinetics performance of the battery. In the electrode plate with a high compaction density in this embodiment of the present application, for example, when the compaction density of the positive electrode plate in the fully discharged state is greater than or equal to 2.4 g/cm$^3$, the current collector is easily damaged in a compaction process of the electrode plate under a high pressure, large-sized particles easily generate pits on the current collector, the distribution density of the carbon-based particles having the particle sizes greater than 100 nm in the base coating layer is controlled to be less than or equal to 10 pcs/10 μm, which facilitates reducing a probability that the current collector is damaged in the electrode plate with the high compaction density, thereby further improving an extreme compaction density of the positive electrode plate.

The distribution density of the carbon-based particles having the particle sizes greater than 100 nm in the base coating layer can be measured by the method described above. The positive electrode film layer is segmented in the thickness direction of the electrode plate using an argon ion beam, a scanning electron microscope image or a microscope image is captured, the size of the carbon particles in the base coating layer is detected by statistics collection, the number of the carbon-based particles, having the particle size greater than 100 nm, included in each region of 10 μm in the base coating layer is counted for not less than 5 times, and an average value is calculated.

The base coating layer in this embodiment of the present application may be implemented using any well-known preparing process. For example, operations such as sieving or centralizing are performed in advance in a preparing process of the carbon-based particles to remove large particles of the carbon-based material, so that $Dv_{50}$ of the carbon-based particles added in the preparing process of the base coating layer is in a range of 20 nm to 60 nm. $D_{V90}$ is less than or equal to 70 nm. The carbon-based material and a binder are mixed and stirred to be coated to the current collector to obtain the base coating layer.

In some embodiments, the compaction density of the positive electrode plate in the fully discharged state is greater than or equal to 2.4 g/cm$^3$, and a single-side thickness of the base coating layer is 1 μm to 4 μm.

In some embodiments, the compaction density of the positive electrode plate in the fully discharged state is greater than or equal to 2.5 g/cm$^3$, and a single-side thickness of the base coating layer is 2 μm to 4 μm.

With the increase of the compaction density of the electrode plate, a compressing effect of the lithium-containing phosphate material (for example, having a particle size greater than 1 μm) of the large particles in the positive electrode film layer on the base coating layer is more prominent. Therefore, stress is prone to concentration at the position of the large particles, and even passes through the base coating layer to damage the current collector. Increasing a thickness of the base coating layer facilitates alleviating a stress concentration phenomenon in the electrode plate, which further increases the extreme compaction density of the electrode plate.

The single-side thickness of the base coating layer may be tested in the following manner. According to the method described above, the positive electrode film layer is segmented in the thickness direction of the electrode plate using an argon ion beam. A scanning electron microscope image is captured; in a length direction of the electrode plate, points are taken at an interval of 1 m to measure the thickness of the single-side base coating layer, and after the thicknesses of 10 points of the base coating layer are measured, an average value is calculated. It should be noted that abnormal points, that is, a region having a thickness lower than 50 nm and a thickness greater than 4 m in the base coating layer, need to be avoided in a measurement and point obtaining process. These abnormal points are mainly due to extreme fluctuation in the thickness of an individual region caused by abnormal stress concentration and compression in a compaction process of the electrode plate, and do not have statistical significance.

In some embodiments, a thickness of the positive electrode current collector is less than or equal to 17 μm, optionally, 13 μm to 15 μm.

In some embodiments, the thickness of the positive electrode current collector is 13 μm, 14 μm, 15 μm, 16 μm, and 17 μm, or in a value range between any two of the values.

In some embodiments, the positive electrode current collector may be a metal foil or a composite current collector. For example, as a metal foil, an aluminum foil may be used. The composite current collector may include a polymer material substrate layer and a metal layer formed on at least one surface of the polymer material substrate layer. The composite current collector may be formed by forming a metal material (aluminum, aluminum alloy, nickel, nickel alloy, titanium, titanium alloy, silver, silver alloy, or the like) on a polymer material substrate (for example, a substrate of polypropylene (PP), polyethylene terephthalate (PET), polybutylene terephthalate (PBT), polystyrene (PS), or polyethylene (PE)).

In some embodiments of the lithium-ion secondary battery, the negative electrode plate includes a negative electrode current collector and a negative electrode film layer arranged on at least one side of the negative electrode current collector, and a single-side areal density of the negative electrode film layer is 140 mg/1540 mm$^2$ to 221 mg/1540 mm$^2$; and/or a compaction density of the negative electrode film layer is 1.40 g/cm$^3$ to 1.75 g/cm$^3$.

The single-side areal density and the compaction density of the negative electrode film layer may be tested using methods similar to those for the positive electrode film layer described above.

The areal density and the compaction density of the negative electrode pole film layer are within the above ranges, which is beneficial to improving the energy density of the lithium-ion secondary battery.

In some embodiments, the negative electrode current collector may be a metal foil or a composite current collector. For example, as a metal foil, a copper foil may be used. The composite current collector may include a polymer material substrate layer and a metal layer formed on at least one surface of the polymer material substrate layer. The composite current collector may be formed by forming a metal material (copper, copper alloy, nickel, nickel alloy, titanium, titanium alloy, silver, silver alloy, or the like) on a polymer material substrate (for example, a substrate of polypropylene (PP), polyethylene terephthalate (PET), polybutylene terephthalate (PBT), polystyrene (PS), or polyethylene (PE)).

In some embodiments, the negative electrode film layer includes a negative electrode active material. The negative electrode active material may be a negative electrode active material used for a battery and well known in the art. For example, the negative electrode active material may include at least one of the following materials: artificial graphite, natural graphite, soft carbon, hard carbon, a silicon-based material, a tin-based material, and lithium titanate. The silicon-based material may be selected from at least one of elemental silicon, a silicon oxide, a silicon-carbon compound, a silicon-nitrogen compound, and a silicon alloy. The tin-based material may be selected from at least one of elemental tin, a tin oxide, and a tin alloy. However, the present application is not limited to these materials, and other conventional materials that can be used as the negative electrode active material for a battery may alternatively be used. One type of these negative electrode active materials may be used individually, or two or more types of these negative electrode active materials may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer further optionally includes another additive such as a thickener (for example, sodium carboxymethyl cellulose (CMC-Na)).

In some embodiments, the negative electrode plate may be prepared in the following manner. The above components for preparing the negative electrode plate, such as the negative electrode active material, the conductive agent, the binder, and any other component, are dispersed in a solvent (e.g., deionized water) to form a negative electrode slurry. The negative electrode slurry is coated on the negative electrode current collector, followed by oven drying, compacting, and other processes, to obtain the negative electrode plate.

In some embodiments, the lithium-ion secondary battery includes an electrolyte. The electrolyte plays a role in conducting ions between the positive electrode plate and the negative electrode plate. The type of the electrolyte is not particularly limited in the present application, and may be selected according to requirements. For example, the electrolyte may be in a liquid state, a gel state, or an all-solid state.

In some embodiments, an electrolyte solution is used as the electrolyte. The electrolyte solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte solution further optionally includes an additive. For example, the additive can include a negative electrode film-forming additive and a positive electrode film-forming additive and can further include additives that can improve some properties of the battery, for example, an additive that improves the overcharge performance of the battery and an additive that improves the high-temperature or low-temperature performance of the battery.

In some embodiments, the lithium-ion secondary battery further includes a separator. The type of the separator is not particularly limited in the present application, and any well-known separator of a porous structure having good chemical stability and mechanical stability may be used.

In some embodiments, a material of the separator may be selected from at least one of glass fiber, non-woven cloth, polyethylene, polypropylene, and polyvinylidene fluoride. The separator may be a single-layer film or a multi-layer composite film without special limitations. When the separator is the multi-layer composite film, a material in each layer may be identical or different, which is not particularly limited.

In some embodiments, the positive electrode plate, the negative electrode plate, and the separator can be made into an electrode assembly by a winding process or a lamination process.

In some embodiments, the lithium-ion secondary battery may include an outer package. The outer package may be used for encapsulating the above electrode assembly and the electrolyte.

In some embodiments, the outer package of the lithium-ion secondary battery may be a hard case, for example, a hard plastic case, an aluminum case, or a steel case. The outer package of the secondary battery may alternatively be a soft package such as a pouch-type soft package. A material of the soft package may be plastic such as polypropylene, polybutylene terephthalate, polybutylene succinate, and the like.

A second aspect of the present application provides a battery apparatus, including the lithium-ion secondary battery provided in the first aspect of the present application. The battery apparatus includes at least one of a battery module, a battery pack, and an energy storage battery.

A third aspect of the present application provides an electric apparatus, including the lithium-ion secondary battery provided in the first aspect of the present application.

A fourth aspect of the present application further provides a preparation method for a positive electrode active material, including: obtaining a mixed raw material including a carbon source, a lithium source, an iron source, and a phosphorus source, where the carbon source includes polyethylene glycol, and the iron source includes ferrous iron; obtaining a mixed slurry after grinding in a solvent, where a volume distribution particle size $Dv_{50}$ of particles in the mixed slurry is 1 μm to 4 μm; obtaining a precursor powder after drying the mixed slurry; and sintering the precursor powder to obtain the positive electrode active material, where the sintering includes at least two segments of constant-temperature sintering, and a sintering temperature of a high-temperature segment is 750° C. to 800° C.

According to the preparation method provided in this embodiment of the present application, a content of large particles in the positive electrode active material is adjusted by controlling the sintering temperature and the particle size of the precursor. In addition, a graphitization degree of the positive electrode active material is further improved using polyethylene glycol as the carbon source in combination with control over the sintering temperature and catalytic reduction of the ferrous iron. A material basis is provided for the positive electrode film layer with an area proportion of particles having a particle size greater than or equal to 1.5 μm greater than or equal to 8.0% and less than or equal to 20.0%, and a median $C_{50}$ of the graphitization degree greater than or equal to 0.95 and less than or equal to 1.20 in a section in a thickness direction of the electrode plate.

In some embodiments, a volume distribution particle size $Dv_{50}$ of the particles in the mixed slurry is 1 μm to 4 μm.

In the present application, the term "$Dv_{50}$" refers to a particle size corresponding to a case in which the cumulative volume particle size distribution percentage of a sample, which is tested by a Malvern laser scattering method, reaches 50%.

In some embodiments, the volume distribution particle size $Dv_{50}$ of the particles in the mixed slurry is optionally 1 μm, 1.5 μm, 2 μm, 2.5 μm, 3 μm, 3.5 μm, and 4.0 μm, or in a value range between any two of the values.

The volume distribution particle size $Dv_{50}$ of the particles in the mixed slurry is in the above range, so that on the one hand, the activity of the particles can be increased to some extent, and some particles of the positive electrode active material having a particle size of 1 μm to 2 μm can be generated under the same temperature, thereby improving the compaction density of the electrode plate and the energy density of the battery; and on the other hand, the catalytic decomposition efficiency of the iron element on the surface of the crystal nucleus on the carbon source can be improved, the coating quality of the carbon source is improved, and the coating uniformity of the carbon coating layer and the graphitization degree are improved, thereby further improving the compaction density of the electrode plate and the energy density of the battery.

An area proportion of large-sized particles on a surface of a positive electrode film layer prepared using the positive electrode active material prepared by the preparation method is small, and the positive electrode active material has a high graphitization degree, so that a compaction density of the electrode plate can be easily improved by slippage between particles, which facilitates improving the energy density of the battery while improving the kinetics performance of the battery.

In some embodiments, the iron source includes ferrous iron, which is optionally one or more of ferrous oxalate, ferrous carbonate, and ferrous nitrate.

In some embodiments, the lithium source includes one or more of lithium dihydrogen phosphate, lithium phosphate, lithium carbonate, and lithium acetate.

In some embodiments, the carbon source includes a polymer carbon source, which is optionally one or more of polyethylene glycol and polyvinyl alcohol.

In some embodiments, the phosphorus source includes one or more of lithium dihydrogen phosphate, phosphoric acid, and ammonium dihydrogen phosphate.

In some embodiments, the lithium source and the phosphorus source may be the same material.

In some embodiments, the iron source includes ferrous oxalate, the lithium source and the phosphorus source include lithium dihydrogen phosphate, and the carbon source includes polyethylene glycol.

In a sintering process, the ferrous iron source preferentially decomposes to generate a large quantity of ferrous oxide, which is used as a nucleation position to generate nanocrystalline nuclei of lithium-containing transition metal phosphate. Moreover, the polymer carbon source has a relatively low decomposition temperature, and the iron element located on the surface of the nanocrystalline nucleus may further catalyze the decomposition of the carbon source, allowing the carbon coating layer on the surface of the positive electrode active material to have a relatively high graphitization degree at a relatively low sintering temperature, reducing the electrical resistivity of the positive electrode active material, and improving the compactness and uniformity of coating of the carbon coating layer on the surface of the lithium-containing transition metal phosphate. In addition, uniform deposition of the carbon on the surface of the lithium-containing transition metal phosphate may further hinder the growth of crystal grains of the lithium-containing transition metal phosphate, thereby reducing the probability that the particles of the positive electrode active material grow into large particles having the particle size greater than 1.5 μm.

In some embodiments, a particle size $D_{10}$ of the ferrous oxalate is greater than or equal to 3 μm, a particle size $D_{50}$ is 50 μm to 80 μm, and a particle size $D_{90}$ is less than or equal to 150 μm.

In the present application, the terms "$D_{10}$", "$D_{50}$", and "$D_{90}$" refer to particle sizes corresponding to a case in which the cumulative particle size distribution percentages of a sample, which are tested by a Malvern laser scattering method, reach 10%, 50%, and 90%.

By controlling the particle size $D_{10}$ of the ferrous oxalate to be greater than or equal to 3 μm, the proportion of ferrous oxalate particles having a small particle size can be reduced, so that reaction activity thereof in a grinding process can be controlled. By controlling the particle sizes $D_{50}$ and $D_{90}$ of the ferrous oxalate, it facilitates uniform mixing between raw materials in a grinding process, thereby obtaining a mixed slurry having consistent components and a uniform particle size, and improving particle size consistency of the prepared lithium-containing transition metal phosphate.

In some embodiments, a mass content of the ferric ion element is less than or equal to 0.08%.

In some embodiments, the mass content of the ferric iron element is optionally 0.01%, 0.02%, 0.03%, 0.04%, 0.05%, 0.06%, 0.07%, and 0.08%, or in a value range between any two of the values.

By controlling the mass content of the ferric ion element, it facilitates improving the uniformity and consistency of the carbon coating layer. An excessively high content of the ferric iron element preferentially consumes the carbon source, causing poor consistency of the quality and the thickness of the carbon coating layer between the particles. On one hand, the carbon coating layer with a nonuniform thickness affects compaction between the particles, and on the other hand, a local carbon deficiency may affect overlapping of a conductive network between the particles, which is not beneficial to effective improvement of the compaction density and kinetics improvement of the electrode plate.

In some embodiments, an atomic molar ratio of a lithium element to an iron element in the lithium source and the iron source is 1.0:1.0 to 1.05:1.0.

In some embodiments, the atomic molar ratio of the lithium element to the iron element in the lithium source and the iron source is optionally 1.0:1.0, 1.01:1.0, 1.02:1.0, 1.03:1.0, 1.04:1.0, and 1.05:1.0, or in a value range between any two of the values. In some embodiments, the carbon source includes a polymer carbon source, which is optionally one or more of polyethylene glycol and polyvinyl alcohol.

In some embodiments, a mass content of the carbon source is 1% to 4% based on the total mass of the positive electrode film layer.

The polymer carbon source has a relatively low decomposition temperature and graphitization temperature, so that the carbon coating layer on the surface of the positive electrode active material can decompose to form the carbon layer at a relatively low sintering temperature, which hinders growth and sintering growth of the lithium-containing transition metal phosphate, thereby facilitating reducing the particle size of the positive electrode active material particles.

In addition, the polymer carbon source usually has a relatively high molecular weight or relatively long molecular chains, thereby easily forming a stable framework structure by cross-linking or orientation in a heat treatment process. This orderliness is retained in a high temperature carbonization process, which facilitating directional growth of the graphite crystal. Moreover, the long chains are entangled and cross-linked to each other, so as to reduce structural defects and reduce lattice disorder caused by chain breaking in the process of carbonization, thereby improving the graphitization degree.

Organic molecules in the carbon source may decompose at a high temperature to release carbon atoms, and micro gaps or defects on the surface of the active material may be covered or filled with the carbon atoms, thereby reducing surface roughness. The coating layer formed by the polymer carbon source has a relatively high graphitization degree and a tighter carbon structure, which is beneficial for optimizing the surface roughness of the positive electrode active material.

In some embodiments, a weight average molecular weight of the polyethylene glycol is less than 10,000.

In some embodiments, the weight average molecular weight of the polyethylene glycol is optionally 1500, 2000, 3000, 4000, 6000, and 8000, or in a value range between any two of the values.

Using the polyethylene glycol with the weight average molecular weight less than 10,000, a decomposition rate during sintering may be controlled, so as to form a carbon coating layer having a suitable and uniform thickness.

In some embodiments, a water content of the polyethylene glycol is less than or equal to 0.5%.

If the water content of the polyethylene glycol is relatively high, water may affect a decomposition process, so that decomposition of the polyethylene glycol is incomplete or a decomposition rate is inconsistent during sintering of the polyethylene glycol. Excessive water may further cause uneven distribution of the fused polyethylene glycol in the sintering process, which affects the uniformity of the carbon layer, thereby causing instability or an exfoliation phenomenon of the carbon coating layer.

In some embodiments, the water content of the polyethylene glycol is optionally 0, 0.1%, 0.2%, 0.3%, 0.4%, and 0.5%, or in a value range between any two of the values.

In some embodiments, pH of the polyethylene glycol is 5-7.

Polyethylene glycol with a pH of 5-7 has high stability. This prevents degradation caused by excessive acidity in a mixing process, and especially under a high-temperature condition, degradation of the polyethylene glycol may cause rapid decomposition and affect the quality of the coating layer. If the polyethylene glycol is basic, the stability of other components may be affected. Consequently, metal ions are dissolved or undergo an oxidization reaction, and the performance of the final positive electrode active material is affected.

In some embodiments, the slurry further includes a titanium source, optionally, the titanium source includes one or more of titanium dioxide, tetrabutyl titanate, titanium nitrate, and titanic acid.

The titanium source usually has a relatively low surface activity. Including the titanium source in the slurry can reduce the activity of the lithium-containing transition metal phosphate precursor, inhibit the particle growth of the lithium-containing transition metal phosphate in a high-temperature sintering process, and enable the lithium-containing transition metal phosphate to form small particles in the sintering process.

Titanium is used as a lattice stabilizer, a titanium element usually enters a lattice of the lithium-containing transition metal phosphate in the form of $Ti^{4+}$, and some titanium ions may replace positions of the iron ions, so that the crystal structure is more stable, and a possibility that the lithium and iron ions react, especially at a high temperature or during charge and discharge with a large current is reduced.

Moreover, doping of titanium facilitates improving the sphericity of the particles and reducing the roughness of the particles, thereby enhancing the overall structural stability of the material.

In some embodiments, the sintering includes at least two segments of constant-temperature sintering, where a sintering temperature of a low-temperature segment is 300° C. to 400° C., and holding time is 2 h to 6 h; a sintering temperature of a high-temperature segment is 750° C. to 800° C., and holding time is 8 h to 15 h.

In some embodiments, a temperature increasing rate of increasing the temperature from the low-temperature segment to the high-temperature segment is greater than or equal to 5° C./min.

A target temperature is rapidly increased using a relatively high temperature increasing rate, thereby facilitating uniform growth of particles and reducing existence of the particles having the particle size greater than or equal to 1.5 μm.

In some embodiments, lithium dihydrogen phosphate, ferrous oxalate, polyethylene glycol, and titanium dioxide are mixed uniformly and ground in an organic solution, to obtain a mixed raw material.

An organic solvent can effectively reduce occurrence of a side reaction, thereby improving the purity and consistency of the material. In addition, the organic solvent has relatively good volatility, and is easier to be removed in a subsequent drying process, and does not remain inside a material, so that air cavities are not generated inside the material, and the compactness and structural stability of the material are not affected.

In some embodiments, a mass percentage of the carbon source in the mixed raw material is 5% to 7% based on a total mass of the mixed raw material.

In some embodiments, the mass percentage of the carbon source in the mixed raw material is optionally 5%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, and 7%, or in a value range between any two of the values based on the total mass of the mixed raw material.

By controlling the mass content of the carbon source and lithium to be in the above range, the electrical conductivity of the material can be enhanced, so that negative impacts on the specific capacity of the positive electrode plate and the energy density of the battery can be reduced. An excessively thick carbon layer not only occupies effective space of the active material, but also may cause an unstable structure of the material.

In some embodiments, the solvent includes water and a mixture thereof.

In some embodiments, the obtaining a mixed raw material including a carbon source, a lithium source, an iron source, and a phosphorus source includes: adding the carbon source, the lithium source, the phosphorus source, the iron source, and the carbon source to a solvent, and performing mixing and stirring, where a rotation speed of the stirring is 1400 rpm to 2200 rpm.

In some embodiments, the obtaining a precursor powder after drying the mixed slurry includes: obtaining the precursor powder after spray-drying of the mixed slurry.

In some embodiments, the product is pulverized by airflow after the precursor is sintered to obtain the positive electrode active material.

In some embodiments, a classification frequency of airflow pulverization is 18 Hz to 24 Hz, and air pressure for pulverization is 0.45 MPa to 0.65 MPa.

The classification frequency in the airflow pulverization refers to an operating frequency of a classification apparatus in the airflow pulverization, and is usually related to the classification efficiency and particle size distribution of the particles. Due to a higher classification frequency, the particles in airflow may be screened for more times, so that larger particles are screened out, and smaller particles are left. In addition, a relatively high classification frequency may increase the number of times of collision of the particles, so that an irregular particle is further impacted, and a particle surface becomes smoother and tends to be spherical.

A high air pressure may cause the particles to bear a larger impact force, and collision between the particles is more severe, which may cause relatively strong impact and abrasion on the surface of the particles. The large particles can be pulverized into small particles, collision between the particles is more severe, and the surface is more likely to be modified, thereby improving the sphericity and the surface flatness of the particles.

However, an excessively high classification frequency and pulverizing air pressure may cause the agglomerated particles to be dispersed into primary particles which subsequently crack and are crushed, affecting a predetermined particle graduation distribution, and making the carbon coating layer incomplete, which is manifested by an increase in dissolved iron, negatively affecting slippage of the particles during rolling, and increasing contact and reaction between the lithium-containing transition metal phosphate and an electrolyte solution under external factors, which is not beneficial to maintenance of the cycle performance and the life of the battery. Therefore, the classification frequency and pulverization air pressure of the airflow pulverization need to be controlled to be within a proper interval.

A fifth aspect of the present application provides a preparation method for a positive electrode plate, and the preparation method includes: sequentially adding a binder, a conductive agent, and the positive electrode active material prepared by the preparation method of the fourth aspect for dry mixing, then adding a solvent, and after stirring and adjusting the viscosity, obtaining a final slurry; and transferring and coating the final slurry to at least one side of a current collector, and after oven drying and hot pressing, obtaining the positive electrode plate.

In some embodiments, the stirring includes pre-stirring and main stirring, a stirring speed of the pre-stirring is lower than that of the main stirring, a revolution speed of the pre-stirring is 20 rpm to 30 rpm, a rotation speed of the pre-stirring is 450 rpm to 550 rpm, and a period of the pre-stirring is 10 min to 20 min.

In some embodiments, the hot pressing includes at least three times of hot rolling, hot roller pressures are sequentially increased, and the hot roller pressures are sequentially 20 tons to 50 tons, 50 tons to 70 tons, and 70 tons to 90 tons; and a hot roller temperature is 40° C. to 80° C. Before entering hot roller compaction for the first time, the electrode plate is heated, and a temperature of the heating is 40° C. to 50° C.

In this embodiment of the present application, the above hot pressing process is used in combination with the positive electrode active material prepared by the preparing method of the fourth aspect, which is beneficial to further reducing the porosity of the section of the positive electrode film layer, thereby increasing the extreme compaction density of the electrode plate, and improving the energy density of the battery.

In addition, the present application further provides an electric apparatus, and the electric apparatus includes at least one of the secondary battery, the battery module, or the battery pack provided in the present application. The secondary battery, the battery module, or the battery pack can be used as a power supply for the electric apparatus, and can also be used as an energy storage unit for the electric apparatus. The electric apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the electric apparatus, the secondary battery, the battery module, or the battery pack can be selected according to the requirements during use.

Figure 7:
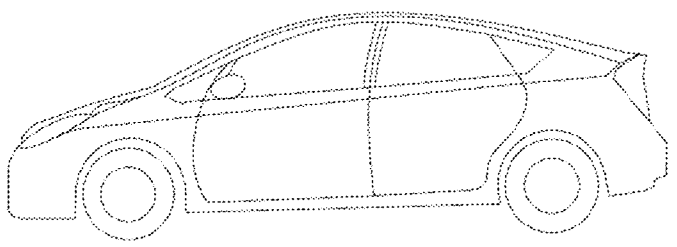
FIG. 7 is a schematic diagram of an electric apparatus using the lithium-ion secondary battery as a power supply according to an embodiment of the present application.

FIG. 7 shows an electric apparatus as an example. The electric apparatus is an all-electric vehicle, a hybrid electric vehicle, a plug-in hybrid electric vehicle, etc. In order to meet the requirements of the electric apparatus for high power and high energy density of a secondary battery, a battery pack or a battery module may be used.

As another example, the apparatus may be a mobile phone, a tablet computer, a notebook computer, or the like. The apparatus is generally required to be light and thin, and can use a secondary battery as a power supply.

EXAMPLES

Examples of the present application will be described hereinafter. The examples described below are exemplary, and are only intended to explain the present application rather than being construed as a limitation to the present application. In examples in which no specific technologies or conditions are specified, technologies or conditions described in the literature in the art or product specifications are followed. The reagents or instruments used without manufacturers indicated are all commercially available conventional products.

Example 1

(1) Preparation of Positive Electrode Active Material

Lithium dihydrogen phosphate, ferrous oxalate, polyethylene glycol, and titanium oxide were mixed uniformly and ground in methanol, to obtain a mixed raw material. A ratio of the lithium dihydrogen phosphate to the ferrous oxalate was controlled such that a molar ratio of lithium to iron was 1.03:1.0. A particle size $D_{10}$ of the ferrous oxalate was 6.1 μm, a particle size $D_{50}$ thereof was 60.5 μm, a particle size $D_{90}$ thereof was 105.5 μm, a mass content of a Fe element in the ferrous oxalate was 30.9%, and a mass content of a ferric iron element was 0.03%.

The mixed raw material was ball-milled in a ball mill for multiple times and demagnetized to obtain a mixed slurry. The number of times of grinding and time of grinding were controlled, and a particle size $Dv_{50}$ of the ground mixed slurry was 3.0 μm.

After spray drying of the mixed slurry, a dry precursor powder material was obtained, and the dry precursor powder material was light yellow and had a uniform color in terms of the appearance.

The precursor powder material was placed in a sintering furnace, heated from 25° C. to 350° C. in a nitrogen atmosphere at a rate of 2° C./min and kept at the temperature for 3 h, then heated to a second temperature of 770° C. at a rate of 5° C./min and kept at the temperature for 10 h, and then cooled after the procedure ended.

The obtained material was crushed using an airflow pulverizing method at a wind volume with a classification frequency of 22 Hz and a pulverizing air pressure of 0.55 MPa to obtain a carbon-coated lithium iron phosphate positive electrode active material.

A mass content of a carbon element of the positive electrode active material was 1.2%, a median $L_{450}$ of sphericity was 0.719, and a median $R_{450}$ of roughness was 0.939, a lithium-iron antisite defect concentration was 0.62%, a powder tap density was 1.04 g/cm$^3$, a powder compaction density under a pressure of 3 T was 2.57 g/cm$^3$, and a powder resistivity under a pressure intensity of 8 Mpa was 5.58 Ω·cm; a gravimetric discharge capacity at a discharge rate of 1C was 141.4 mAh/g; a discharge plateau existed in a voltage range of 2.5 V to 2.9 V, and a discharge capacity ratio of the discharge plateau of 3.2 V was 90.52%.

(2) Preparation of Positive Electrode Plate

After 2.2 wt % of PVDF, 0.8 wt % of conductive carbon black, and 97.0 wt % of the positive electrode active material were sequentially added for dry mixing, N-methypyrrolidone was added, followed by stirring and viscosity adjusting, to obtain a final slurry; and the final slurry was transferred and coated to a base coating layer of a current collector aluminum foil, where the base coating layer included carbon black and PVDF, and a mass ratio of the carbon black to the PVDF was 1:1, and in the base coating layer, a distribution density of carbon-based particles having a particle size greater than 100 nm in the base coating layer was less than or equal to 10 pcs/10 μm, and a thickness of the base coating layer was 2 μm. After oven drying and hot pressing, a positive electrode film layer with a single-side areal density of 350 mg/1540 cm$^2$ was obtained.

The stirring included pre-stirring and main stirring, a stirring speed of the pre-stirring was lower than that of the main mixing, a revolution speed of the pre-stirring was 25 rpm, a rotation speed was 500 rpm, and a period of the pre-stirring was 15 min.

A hot pressing process included three times of hot rolling processes. Hot roller pressures were sequentially increased, and the hot roller pressures were sequentially 35 tons, 55 tons, and 75 tons. A hot roller temperature was 65° C. Before entering hot roller compaction for the first time, the electrode plate was heated, and a temperature of the heating was 50° C.

A compaction density of the electrode plate was an extreme compaction density of the electrode plate, and reference may be made to the following description for testing the extreme compaction density of the electrode plate. In this embodiment, the extreme compaction density of the electrode plate was 2.68 g/cm$^3$.

17,707 particles were counted in a section of the positive electrode film layer in a thickness direction of the electrode plate, the result indicated that 79 particles having particle sizes ranging from 1.5 μm to 5 μm existed in the section of the positive electrode film layer, and an area proportion was 14.58%. Particles having a particle size above than 5 μm did not exist, and an area proportion of particles having a particle size greater than or equal to 1 μm and less than 1.5 μm was 19.70%. A median $C_{50}$ of a graphitization degree obtained in a mapping mode by a laser confocal microscope Raman spectrometer for the positive electrode film layer was 1.02, $C_{90}$ was 1.04, $C_{10}$ was 1.0, and a concentration degree $(C_{90}-C_{10})/C_{50}$ of a C value was 0.034.

An iron dissolution rate of the positive electrode film layer was 1076 ppm.

(3) Preparation of Negative Electrode Plate 95.5 wt % of a negative electrode active material (artificial graphite), 1.0 wt % of a conductive agent (conductive carbon black), 2.0 wt % of a binder (styrene-butadiene rubber (SBR)), and 1.5 wt % of a thickener (sodium carboxymethyl cellulose (CMC)) were mixed, deionized water was added for stirring, and a negative electrode slurry was prepared by dispersion. Then, the negative electrode slurry was coated onto surfaces of both sides of a Cu foil, and after the both sides were completed, oven drying, cold pressing, slitting, and plate making were performed to prepare a negative electrode plate. A single-side areal density of coating was 165 mg/1540 mm$^2$, and a compaction density was 1.60 g/cm$^3$.

(4) Preparation of Separator

A polypropylene film was used as a separator.

(5) Preparation of Electrolyte Solution

In an argon atmosphere glove box ($H_2O$<0.1 ppm, $O_2$<0.1 ppm), as an organic solvent, ethylene carbonate (EC) and dimethyl carbonate (DMC) were mixed uniformly according to a volume ratio of 1/1, a lithium salt ($LiPF_6$) was added and dissolved in the organic solvent, with a content of $LiPF_6$ in a solution of 1 mol/L, and uniform stirring was performed to obtain an electrolyte solution.

(6) Preparation of Battery

The positive electrode plate, the separator, and the negative electrode plate were laminated in sequence, so that the separator could play a role in isolating a cathode and an anode, a bare battery cell was obtained by winding and placed in an outer package, and an electrolyte solution was injected, followed by processes such as encapsulating, formation and venting to obtain a final lithium-ion battery.

Preparation methods in Examples 2 and 3 are basically the same as that in Example 1, but the difference lies in that a sintering temperature of the precursor powder material is adjusted.

Example 2

The precursor powder material was placed in a sintering furnace, heated from 25° C. to 350° C. in a nitrogen atmosphere at a rate of 2° C./min and kept at the temperature for 3 h, then heated to a second temperature of 755° C. at a rate of 5° C./min and kept at the temperature for 10 h, and then cooled after the procedure ended.

Example 3

The precursor powder material was placed in a sintering furnace, heated from 25° C. to 350° C. in a nitrogen atmosphere at a rate of 2° C./min and kept at the temperature for 3 h, then heated to a second temperature of 790° C. at a rate of 5° C./min and kept at the temperature for 10 h, and then cooled after the procedure ended.

Preparation methods in Examples 4 and 5 are basically the same as that in Example 1, but the difference lies in that a particle size $Dv_{50}$ of the ground mixed slurry is adjusted.

Example 4

The mixed raw material was ball-milled in a ball mill for multiple times and demagnetized to obtain a mixed slurry.

The number of times of grinding and time of grinding were controlled, and a particle size $DV_{50}$ of the ground mixed slurry was 4.0 μm.

Example 5

The mixed raw material was ball-milled in a ball mill for multiple times and demagnetized to obtain a mixed slurry. The number of times of grinding and time of grinding were controlled, and a particle size $Dv_{50}$ of the ground mixed slurry was 1.5 μm.

Example 6

A preparation method in Example 6 is basically the same as that in Example 1, but the difference lies in that no conductive carbon black is added when the positive electrode plate is prepared.

97.8 wt % of the positive electrode active material and 2.2 wt % of PVDF were mixed, and then N-methypyrrolidone was added, followed by stirring and dispersing to prepare the positive electrode slurry.

Preparation methods in Examples 7 and 8 are basically the same as that in Example 1, but the difference lies in that a carbon source in the preparation method for the positive electrode active material is adjusted.

Example 7

A mixture of lithium dihydrogen phosphate, ferrous oxalate, polyethylene glycol, and glucose and titanium oxide were mixed uniformly and ground in methanol. A ratio of the lithium dihydrogen phosphate to the ferrous oxalate was controlled such that a molar ratio of lithium to iron was 1.03:1.0; and a mass ratio of the polyethylene glycol to the glucose was 3:1.

Example 8

A mixture of lithium dihydrogen phosphate, ferrous oxalate, polyethylene glycol, and glucose and titanium oxide were mixed uniformly and ground in methanol. A ratio of the lithium dihydrogen phosphate to the ferrous oxalate was controlled such that a molar ratio of lithium to iron was 1.03:1.0; and a mass ratio of the polyethylene glycol to the glucose was 1:3.

A preparation method in Comparative Example 1 is basically the same as that in Example 1, and the differences lie in that a carbon source is replaced with glucose and a sintering temperature of the precursor powder material is adjusted.

Comparative Example 1

Lithium dihydrogen phosphate, ferrous oxalate, glucose, and titanium oxide were mixed uniformly and ground in methanol, to obtain a mixed raw material. The precursor powder material was placed in a sintering furnace, heated from 25° C. to 350° C. in a nitrogen atmosphere at a rate of 2° C./min and kept at the temperature for 3 h, then heated to a second temperature of 803° C. at a rate of 5° C./min and kept at the temperature for 10 h, and then cooled after the procedure ended.

A preparation method in Comparative Example 2 is basically the same as that in Example 1, and the differences lie in that the sintering temperature of the precursor powder material and a particle size $Dv_{50}$ of the ground mixed slurry are adjusted and the carbon source is replaced with glucose.

Comparative Example 2

Lithium dihydrogen phosphate, ferrous oxalate, glucose, and titanium oxide were mixed uniformly and ground in methanol. The mixed raw material was ball-milled in a ball mill for multiple times and demagnetized to obtain a mixed slurry. The number of times of grinding and time of grinding were controlled, and a particle size $Dv_{50}$ of the ground mixed slurry was 4.0 μm. After spray drying of the mixed slurry, a dry precursor powder material was obtained, and the dry precursor powder material was light yellow and had a uniform color in terms of the appearance. The precursor powder material was placed in a sintering furnace, heated from 25° C. to 350° C. in a nitrogen atmosphere at a rate of 2° C./min and kept at the temperature for 3 h, then heated to a second temperature of 750° C. at a rate of 5° C./min and kept at the temperature for 10 h, and then cooled after the procedure ended.

Performance Test

1. Energy Density Test

The lithium-ion secondary battery was allowed to stand at 25° C. for 2 h, to ensure that a temperature of the lithium-ion secondary battery was 25° C. After the lithium-ion secondary battery was charged to a charge cut-off voltage of 3.65 V at 25° C. at 0.33C, constant-voltage charge continued to be performed at the charge cut-off voltage until a current of 0.05C was achieved, and charge was cut off (where C represents a rated capacity of the lithium-ion secondary battery). After the lithium-ion secondary battery was allowed to stand at 25° C. for 1 h, the lithium-ion secondary battery was discharged at 25° C. at 0.33C to a discharge cut-off voltage of 3.65 V, and total discharge energy of the lithium-ion secondary battery was recorded as $E_0$.

A length, width, and height of a battery cell were measured, and a volume value $V_0$=length*width*height of the battery cell was calculated. A volumetric energy density of the lithium-ion secondary battery=discharge energy $E_0$ of the lithium-ion secondary battery/volume $V_0$ of the lithium-ion secondary battery.

2. Direct Current Resistance (DCR) Test Method

After being charged to 3.65 V at 25° C. at a constant current of 0.33C, and charged to a current of 0.05C at a constant voltage, the lithium-ion secondary battery was discharged to 20% SOC at 0.33C; after being allowed to stand for 5 min, the lithium-ion secondary battery was discharged by a pulse of 3C for 30 s; after being allowed to stand for 40 s, the lithium-ion secondary battery was charged at 3C for 40 s; after being allowed to stand for 5 min, charged to 3.65 V at a constant current of 0.33C, and charged to 0.05C at a constant voltage, the lithium-ion secondary battery was discharged to 10% SOC at 0.33C; after being allowed to stand for 5 min, the lithium-ion secondary battery was discharged by a pulse of 3C for 30 s; after being allowed to stand for 40 s, the lithium-ion secondary battery was charged at 3C for 40 s; after being allowed to stand for 5 min and fully charged at 0.33C, the lithium-ion secondary battery was discharged to 50% SOC at 0.33C; then after being allowed to stand at −25° C. for 2 h, the lithium-ion secondary battery was discharged by a pulse of 1C for 30 s, allowed to stand for 10 min, and then allowed to stand at 25° C. for 2 h; after being charged to 3.65 V at a constant current of 0.33C and charged to 0.05C at a constant voltage, the lithium-ion secondary battery was discharged to 20% SOC at 0.33C; after being allowed to stand at −25° C. for 2 h, the lithium-ion secondary battery was discharged by a pulse of 1C for 30 s and then allowed to stand for 10 min.

A current voltage was recorded before and after each pulse discharge, and a DCR in different conditions was calculated. A calculation formula was DCR=(a voltage before pulse discharge after standing ends−a voltage before the standing after pulse discharge)/pulse current.

3. Extreme Compaction Density of the Electrode Plate

The double-side coated electrode plate was compacted by a roller press, an extension rate of the compacted electrode plate was tested, and the flexibility of the compacted electrode plate was evaluated at the same time. By increasing the pressure of the roller press, electrode plates of different compaction densities were obtained. As the pressure increased, the compaction density of the electrode plate increased, the extension rate of the electrode plate increased, and the flexibility of the electrode plate decreased. An excessively high extension rate of the electrode plate easily caused warpage of the electrode plate, and excessively low flexibility of the electrode plate easily caused brittleness of the electrode plate. Therefore, a smaller one of the corresponding compaction densities when the extension rate of the electrode plate was 8% or when the number of times of flexible folding of the electrode plate was 3 was defined as the extreme compaction density of the electrode plate.

The compaction density was calculated using a mass of the positive electrode film layer/a volume of the positive electrode film layer.

A test method for the extension rate was as follows:

The electrode plate was flatly laid on a horizontal desktop, and cut into segments, with the length of each segment of the electrode plate being approximately 100 cm. A base material copper foil at an edge of the electrode plate was removed. The cut edge of the electrode plate was kept parallel to a machine direction (MD) (perpendicular to the direction of a pressing roller) of the electrode plate, to ensure that the electrode plate was completely covered by the coating. A length between marked points at the same width position in a length direction between a head and a tail of the electrode plate was measured with a steel rule, and the length was estimated to be 0.1 mm. The length before compaction was recorded. After the compaction, a length between the corresponding marked points was recorded, and (the length after the compaction—the length before the compaction)/the length before the compaction was used as the extension rate of the electrode plate.

A test method for the number of times of flexible folding was as follows:

The positive electrode plate was cut into test samples with a size of 20×100 mm$^2$. After being folded in half in the MD, the test sample was flattened using a 2 kg pressing roller, and unfolded and inspected against light to check whether a gap was transparent to light. If the gap was not transparent to light, the test sample was folded in half in the opposite direction, flattened using the 2 kg pressing roller, and inspected against light again. This operation was repeated until the gap was transparent to light, and the number of times of folding was recorded. The test was repeated for three times, and an average value was taken as reference data of the flexibility of the electrode plate.

Test Results

TABLE 1

| | Carbon source | Particle size $D_{v50}$ of the ground mixed slurry μm | Sintering temperature/ ° C. | Mass content of the conductive agent | $C_{50}$ of the graphitization degree | Area proportion of the particles having the particle size of 1.5 μm to 5 μm | Area proportion of the particles having the particle size greater than or equal to 1 μm and less than 1.5 μm |
|---|---|---|---|---|---|---|---|
| Example 1 | PEG | 3.0 | 770 | 0.80% | 1.02 | 14.58% | 19.70% |
| Example 2 | PEG | 3.0 | 755 | 0.80% | 0.97 | 9.02% | 23.97% |
| Example 3 | PEG | 3.0 | 790 | 0.80% | 1.13 | 19.43% | 16.02% |
| Example 4 | PEG | 4.0 | 770 | 0.80% | 1.00 | 12.37% | 20.88% |
| Example 5 | PEG | 1.5 | 770 | 0.80% | 1.04 | 15.78% | 19.12% |
| Example 6 | PEG | 3.0 | 770 | 0.00% | 1.02 | 14.58% | 19.70% |
| Example 7 | PEG: glucose = 3:1 | 3.0 | 770 | 0.80% | 1.01 | 15.35% | 19.31% |
| Example 8 | PEG: glucose = 1:3 | 3.0 | 770 | 0.80% | 0.99 | 17.21% | 18.18% |
| Comparative Example 1 | Glucose | 3.0 | 803 | 0.80% | 1.07 | 20.33% | 14.45% |
| Comparative Example 2 | Glucose | 4.0 | 750 | 0.80% | 0.93 | 9.12% | 25.21% |

TABLE 2

| | $C_{10}$ of the graphitization degree | $C_{90}$ of the graphitization degree | Concentration degree of the C value | Median $L_{A50}$ of the sphericity | Compaction density g/cm$^3$ of the electrode plate after formation and full discharge |
|---|---|---|---|---|---|
| Example 1 | 1.00 | 1.04 | 0.034 | 0.719 | 2.56 |
| Example 2 | 0.955 | 0.983 | 0.029 | 0.738 | 2.51 |
| Example 3 | 1.1 | 1.144 | 0.039 | 0.702 | 2.6 |
| Example 4 | 0.988 | 1.018 | 0.030 | 0.723 | 2.53 |
| Example 5 | 1.021 | 1.058 | 0.036 | 0.714 | 2.58 |
| Example 6 | 1.00 | 1.04 | 0.034 | 0.719 | 2.56 |

TABLE 2-continued

| | $C_{10}$ of the graphitization degree | $C_{90}$ of the graphitization degree | Concentration degree of the C value | Median $L_{A50}$ of the sphericity | Compaction density g/cm$^3$ of the electrode plate after formation and full discharge |
|---|---|---|---|---|---|
| Example 7 | 0.996 | 1.031 | 0.035 | 0.712 | 2.57 |
| Example 8 | 0.976 | 1.013 | 0.037 | 0.689 | 2.59 |
| Comparative Example 1 | 1.03 | 1.08 | 0.047 | 0.67 | 2.59 |
| Comparative Example 2 | 0.915 | 0.962 | 0.051 | 0.739 | 2.45 |

TABLE 3

| | DCR 25° C. 3C 20% SOC/ mΩ | DCR 25° C. 3C 10% SOC/ mΩ | DCR −25° C. 1C 50% SOC/ mΩ | DCR −25° C. 1C 20% SOC/ mΩ | Energy densit Wh/L |
|---|---|---|---|---|---|
| Example 1 | 43.3 | 60.9 | 388.2 | 445.6 | 445.0 |
| Example 2 | 40.7 | 57.0 | 360.3 | 410.0 | 436.7 |
| Example 3 | 47.7 | 67.6 | 426.3 | 494.7 | 444.9 |
| Example 4 | 42.0 | 58.7 | 377.0 | 430.9 | 440.0 |
| Example 5 | 45.6 | 64.5 | 411.9 | 467.0 | 448.3 |
| Example 6 | 43.8 | 60.4 | 390.1 | 448.9 | 448.7 |
| Example 7 | 45.1 | 64.0 | 408.4 | 464.4 | 446.7 |
| Example 8 | 48.4 | 68.7 | 427.4 | 496.0 | 445.5 |
| Comparative Example 1 | 49.9 | 71.9 | 454.2 | 527.2 | 441.0 |
| Comparative Example 2 | 42.1 | 58.6 | 372.9 | 424.5 | 426.7 |

It can be seen from the comparison between the examples and the comparative examples that in the section of the positive electrode film layer in the thickness direction of the electrode plate, the area proportion of the particles having the particle size greater than or equal to 1.5 μm is greater than or equal to 8.0% and less than or equal to 20.0%. In the cumulative distribution curve of the C value of the graphitization degree obtained in the mapping mode by the laser confocal microscope Raman spectrometer for the positive electrode film layer, when the median $C_{50}$ of the graphitization degree is greater than or equal to 0.95 and less than or equal to 1.20, the compaction density of the positive electrode plate is improved while the battery maintains a low internal resistance (especially, has a low resistance when the SOC is low), so that the battery can achieve a balance between a good energy density and a good kinetics performance.

It can be seen from the comparison between Examples 1 to 8 and Comparative Example 2 that, in the cumulative distribution curve of the C value of the graphitization degree obtained in the mapping mode by the laser confocal microscope Raman spectrometer for the positive electrode film layer, the median $C_{50}$ of the graphitization degree is 0.97 to 1.13, thereby facilitating improving the compaction density of the electrode plate while keeping a low resistance of the battery, and improving the energy density of the battery while keeping a good kinetics performance of the battery.

It can be seen from the comparison between Examples 2 and 8 and Example 1 and Comparative Examples 3-7 that, in the cumulative distribution curve of the C value of the graphitization degree obtained in the mapping mode by the laser confocal microscope Raman spectrometer for the positive electrode film layer, the median $C_{50}$ of the graphitization degree is 1.0 to 1.10, thereby facilitating achieving a high compaction density of the electrode plate while keeping a low resistance of the battery, and achieving a balance between the kinetics performance and the energy density of the battery.

It can be seen from the comparison between Example 2 and Examples 1 and 3-8 that, in the section of the positive electrode film layer in the thickness direction of the electrode plate, the area proportion of the particles having the particle sizes of 1.5 μm to 5 μm is 10.0% to 20.0%, thereby facilitating improving the compaction density of the electrode plate while maintaining a low resistance of the battery, and improving the energy density of the battery while maintaining a good kinetics performance of the battery.

It can be seen from the comparison between Example 6 and Example 1 that the lithium-ion secondary battery of this example of the present application still has a good kinetics performance when no conductive agent is added, so that the energy density of the lithium-ion secondary battery is further improved.

It should be noted that the present application is not limited to the above embodiments. The above embodiments are merely exemplary, and embodiments having substantially the same technical idea and the same effects within the scope of the technical solutions of the present application are all included in the technical scope of the present application. In addition, other embodiments constructed by applying various modifications conceivable to those skilled in the art to the embodiments and combining some of the constituent elements of the embodiments without departing from the scope of the essence of the present application are also included in the scope of the present application.

The invention claimed is:

1. A lithium-ion secondary battery, comprising a positive electrode plate, a negative electrode plate, and an electrolyte, wherein the positive electrode plate comprises a positive electrode current collector and a positive electrode film layer arranged on at least one side of the positive electrode current collector, the positive electrode film layer comprises a positive electrode active material, and the positive electrode active material comprises lithium-containing transition metal phosphate particles with a surface at least partially provided with a carbon coating material, and in a section of the positive electrode film layer in a thickness direction of the electrode plate, an area proportion of particles having a particle size of 1.5 μm to 5 μm is 9.0% to 20.0%; and in a cumulative distribution curve of a C value of a graphitization degree obtained in a mapping mode by a laser confocal microscope Raman spectrometer for the positive electrode film layer, a median $C_{50}$ of the graphitization degree is greater than or equal to 0.95 and less than or equal to 1.20, wherein the C value of the graphitization degree is $I_G/I_D$, $I_G$ represents a G-band intensity of a Raman spectrum at 1580±100 $cm^{-1}$, and $I_D$ represents a D-band intensity of the Raman spectrum at 1350±100 $cm^{-1}$.

2. The lithium-ion secondary battery according to claim 1, wherein in the cumulative distribution curve of the C value of the graphitization degree obtained in the mapping mode by the laser confocal microscope Raman spectrometer for the positive electrode film layer, the median $C_{50}$ of the graphitization degree is 0.97 to 1.13;

in the cumulative distribution curve of the C value of the graphitization degree obtained in the mapping mode by the laser confocal microscope Raman spectrometer for the positive electrode film layer, a concentration degree $(C_{90}-C_{10})/C_{50}$ of the C value is 0.01 to 0.04;

in the section of the positive electrode film layer in the thickness direction of the electrode plate, an area proportion of particles having a particle size greater than or equal to 5 μm is 0%.

3. The lithium-ion secondary battery according to claim 1, wherein the cumulative distribution curve of the C value of the graphitization degree obtained in the mapping mode by the laser confocal microscope Raman spectrometer for the positive electrode film layer, $C_{90}$ of the graphitization degree is 1.00 to 1.30.

4. The lithium-ion secondary battery according to claim 1, wherein in the cumulative distribution curve of the C value of the graphitization degree obtained in the mapping mode by the laser confocal microscope Raman spectrometer for the positive electrode film layer, $C_{10}$ of the graphitization degree is 0.92 to 1.10.

5. The lithium-ion secondary battery according to claim 1, wherein in the section of the positive electrode film layer in the thickness direction of the electrode plate, an area proportion of particles having a particle size greater than or equal to 1 μm and less than 1.5 μm is 15.0% to 25.0%.

6. The lithium-ion secondary battery according to claim 1, wherein in a cumulative distribution curve of a particle areal sphericity obtained from the section of the positive electrode film layer in the thickness direction of the electrode plate, a median $L_{A50}$ of sphericity is 0.60 to 0.85, in a cumulative distribution curve of a particle roughness area obtained from the section of the positive electrode film layer in the thickness direction of the electrode plate, a median $R_{A50}$ of roughness is 0.92 to 0.96.

7. The lithium-ion secondary battery according to claim 1, wherein an iron dissolution rate of the positive electrode film layer is 500 ppm to 2000 ppm;

a mass content of a carbon element is 0.8% to 1.8% based on a total mass of the positive electrode active material, a lithium-iron antisite defect concentration of the positive electrode active material is 0.1% to 1.5%.

8. The lithium-ion secondary battery according to claim 1, wherein the lithium-containing transition metal phosphate comprises a component having the following general formula:

$Li_mF_xP_yO_jQ_q$, wherein

Q comprises one or more of Al, Na, K, Mg, Cu, Mn, Cr, Zn, Pb, Ca, Co, Ni, Sr, Nb, V, Ti, B, S, Si, N, F, Cl, and Br, $0.8 \le m \le 1.15$, $0.9 \le x \le 1$, $0.95 \le y \le 1$, $3.5 \le j \le 4$, and $0 < q \le 0.1$;

the positive electrode active material comprises one or more of lithium iron phosphate, a doping modification material thereof, and a coating modification material thereof.

9. The lithium-ion secondary battery according to claim 1, wherein the positive electrode active material comprises a titanium element, and a mass content of the titanium element is 2000 ppm to 6000 ppm based on a total mass of the positive electrode active material;

a powder tap density of the positive electrode active material is 0.70 $g/cm^3$ to 1.50 $g/cm^3$; a powder compaction density of the positive electrode active material under a pressure of 3 T is 2.50 $g/cm^3$ to 2.70 $g/cm^3$, a powder resistivity of the positive electrode active material under a pressure intensity of 8 MPa is 0.5 Ω·cm to 30.0 Ω·cm.

10. The lithium-ion secondary battery according to claim 1, wherein a gravimetric discharge capacity of the positive electrode active material at room temperature at a discharge rate of 1C is 135 mAh/g to 150 mAh/g.

11. The lithium-ion secondary battery according to claim 1, wherein a discharge capacity ratio η of the positive electrode active material discharged to 3.2 V is greater than or equal to 85%, η is defined as: at room temperature, a button battery comprising the positive electrode active material is charged and discharged twice at a constant current with a rate of 0.1C in a voltage range of 2.0 V to 3.75 V, and then is charged and discharged once at a constant current with a rate of 1C, and in a charge and discharge test at the rate of 1C, a capacity value of a discharge voltage of 3.2 V is extracted and denoted as $C_1$, a capacity value of a discharge voltage to 2.0 V is extracted and denoted as $C_2$, and $\eta = C_1/C_2$, wherein a charge process comprises constant-voltage charge, with a constant voltage of 3.75 V, and a constant voltage cut-off current of 50 μA.

12. The lithium-ion secondary battery according to claim 1, wherein in a 0.1C discharge curve of a button battery comprising the positive electrode active material, a discharge plateau is in a voltage range of 2.5 V to 2.9 V;

a mass content of a conductive agent is 0% to 1.5% based on a total mass of the positive electrode film layer.

13. The lithium-ion secondary battery according to claim 1, wherein the positive electrode film layer further comprises a binder, and a mass content of the positive electrode active material is 95.5% to 99.5%; and a mass content of the binder is 0.5% to 3% based on a total mass of the positive electrode film layer.

14. The lithium-ion secondary battery according to claim 1, wherein a single-side areal density of the positive electrode film layer is 300 mg/1540 $mm^2$ to 450 mg/1540 $mm^2$;

when the lithium-ion secondary battery is in a fully discharged state, a compaction density of the positive electrode film layer is 2.51 $g/cm^3$ to 2.73 $g/cm^3$.

15. The lithium-ion secondary battery according to claim 1, wherein the positive electrode film layer satisfies the following conditions:

(1) when the lithium-ion secondary battery is in a fully discharged state, a compaction density of the positive electrode film layer is 2.51 $g/cm^3$ to 2.73 $g/cm^3$, and in the section of the positive electrode film layer in the thickness direction of the electrode plate, a porosity of the positive electrode film layer is 10% to 22%; and (2) when the lithium-ion secondary battery is in the fully discharged state, the compaction density of the positive electrode film layer is 2.55 g/cm$^3$ to 2.70 g/cm$^3$, and in the section of the positive electrode film layer in the thickness direction of the electrode plate, the porosity of the positive electrode film layer is 10% to 20%.

16. The lithium-ion secondary battery according to claim 1, wherein the positive electrode plate comprises a base coating layer, and the base coating layer is arranged between the positive electrode film layer and the current collector; and the base coating layer satisfies the following conditions:

(1) the base coating layer comprises carbon-based particles, and a distribution density of the carbon-based particles having a particle size greater than 100 nm in the base coating layer is less than or equal to 10 pcs/10 μm;

(2) a compaction density of the positive electrode plate in a fully discharged state is greater than or equal to 2.4 g/cm$^3$, and a single-side thickness of the base coating layer is 1 μm to 4 μm; and (3) the compaction density of the positive electrode plate in the fully discharged state is greater than or equal to 2.5 g/cm$^3$, and the single-side thickness of the base coating layer is 2 μm to 4 μm.

17. A battery apparatus, comprising: the lithium-ion secondary battery according to claim 1 wherein the battery apparatus comprises at least one of a battery module, a battery pack, and an energy storage battery.

18. A lithium-ion secondary battery, comprising a positive electrode plate, a negative electrode plate, and an electrolyte, wherein, the positive electrode plate comprises a positive electrode current collector, a positive electrode film layer arranged on at least one side of the positive electrode current collector, and a base coating layer arranged between the positive electrode film layer and the positive electrode current collector, the base coating layer comprises carbon-based particles, and a distribution density of the carbon-based particles having a particle size greater than 100 nm in the base coating layer is less than or equal to 10 pcs/10 μm;

the positive electrode film layer comprises a positive electrode active material, and the positive electrode active material comprises lithium-containing transition metal phosphate particles with a surface at least partially provided with a carbon coating material;

in a section of the positive electrode film layer in a thickness direction of the electrode plate, an area proportion of particles having a particle size of 1.5 μm to 5 μm is 9.0% to 20.0%, an area proportion of particles having a particle size greater than or equal to 1 μm and less than 1.5 μm is greater than or equal to 16.0% and less than or equal to 20.0%, in a cumulative distribution curve of a C value of a graphitization degree obtained in a mapping mode by a laser confocal microscope Raman spectrometer for the positive electrode film layer, a median $C_{50}$ of the graphitization degree is 0.97 to 1.13, wherein the C value of the graphitization degree is IG/ID, IG represents a G-band intensity of a Raman spectrum at 1580±100 cm$^{-1}$, and ID represents a D-band intensity of the Raman spectrum at 1350±100 cm$^{-1}$, a concentration degree $(C_{90}-C_{10})/C_{50}$ of the C value is 0.01 to 0.04; and when the lithium-ion secondary battery is in a fully discharged state, a compaction density of the positive electrode film layer is 2.51 g/cm$^3$ to 2.73 g/cm$^3$.

* * * * *